United States Patent [19]

Kuwahara et al.

[11] Patent Number: 5,742,348
[45] Date of Patent: Apr. 21, 1998

[54] SPATIAL FREQUENCY ADAPTIVE FIELD—INTERPOLATION METHOD AND APPARATUS THEREFOR

[75] Inventors: Yasuhiro Kuwahara, Osaka; Haruo Yamashita, Ibaraki; Tsumoru Fukushima, Kyoto, all of Japan

[73] Assignee: Matsushita Electric Industrial Co., Ltd., Osaka-Fu, Japan

[21] Appl. No.: 662,293

[22] Filed: Jun. 7, 1996

Related U.S. Application Data

[63] Continuation of Ser. No. 401,542, Mar. 10, 1995, abandoned.

[30] Foreign Application Priority Data

Mar. 15, 1994 [JP] Japan .................. 6-043729

[51] Int. Cl.⁶ .................................. H04N 7/01
[52] U.S. Cl. ............................ 348/441; 348/448
[58] Field of Search ...................... 348/450, 451, 348/452, 448, 458, 699, 700, 459; H04N 7/01

[56] References Cited

U.S. PATENT DOCUMENTS

| | | | |
|---|---|---|---|
| 4,831,435 | 5/1989 | Song et al. | 348/448 |
| 4,933,766 | 6/1990 | de Haan et al. | 358/166 |
| 4,937,667 | 6/1990 | Choquet et al. | 348/448 |
| 4,941,045 | 7/1990 | Birch | 348/448 |
| 4,985,764 | 1/1991 | Sato | 348/448 |
| 5,032,899 | 7/1991 | Sato | 348/450 |
| 5,081,532 | 1/1992 | Rabii | 358/105 |
| 5,093,721 | 3/1992 | Rabii | 358/135 |
| 5,161,014 | 11/1992 | Pearson et al. | 348/443 |
| 5,347,599 | 9/1994 | Yamashita et al. | 348/448 |

FOREIGN PATENT DOCUMENTS

| | | | |
|---|---|---|---|
| 2131689 | 5/1990 | Japan | H04N 7/00 |
| 4343590 | 11/1992 | Japan | H04N 7/01 |
| 4364685 | 12/1992 | Japan | H04N 7/01 |
| 5153563 | 6/1993 | Japan | H04N 7/00 |
| 6153169 | 5/1994 | Japan | H04N 7/01 |

*Primary Examiner*—John K. Peng
*Assistant Examiner*—Nathan J. Flynn
*Attorney, Agent, or Firm*—Panitch Schwarze Jacobs & Nadel, P.C.

[57] ABSTRACT

In interpolation lines having plural angles passing through an attentional pixel on a scanning line in one field to be interpolated having pixels on an upper scanning line placed over the attentional pixel and pixels on a lower scanning line placed under the attentional pixel, a horizontal spatial frequency is detected in the vicinity of the attentional pixel to be interpolated, interpolation directions are derived by plural interpolation direction decision steps on the basis of obtained spatial frequency information, and the scanning line is interpolated by selecting one direction of the plural interpolation directions.

17 Claims, 23 Drawing Sheets

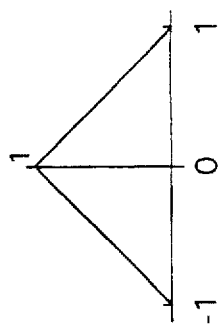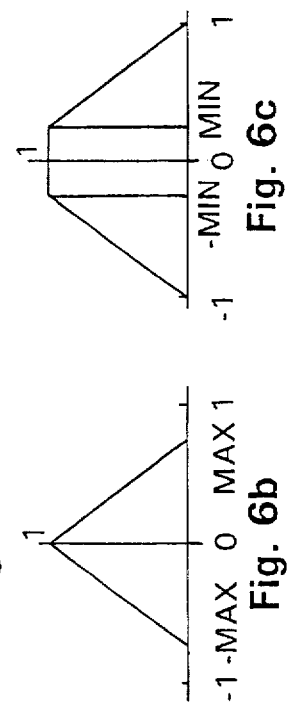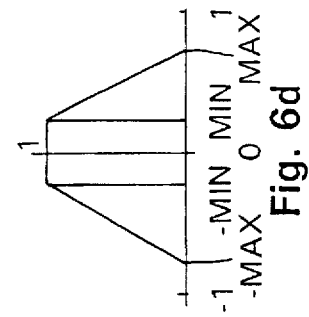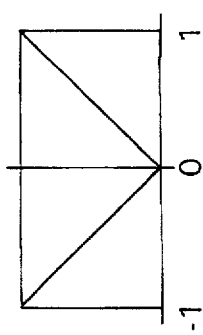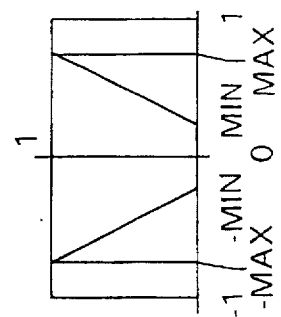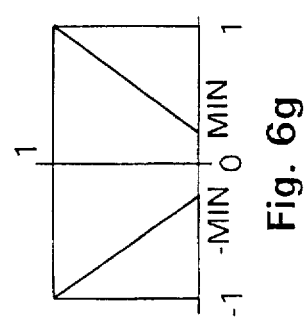

$H_{-3}$  $H_{-2}$  $H_{-1}$  $H_0$  $H_1$  $H_2$  $H_3$ 5,742,348

1

SPATIAL FREQUENCY ADAPTIVE FIELD—INTERPOLATION METHOD AND APPARATUS THEREFOR

This application is a continuation of application Ser. No. 08/401,542 filed Mar. 10, 1995, now abandoned.

FIELD OF THE INVENTION AND RELATED ART STATEMENT

1. Field of the Invention

The present invention relates generally to a field-interpolation method and apparatus therefor, and more particularly to a spatial frequency adaptive field-interpolation method and an apparatus therefor of which a frame signal of one frame is produced from a field signal of one field for example, in the technical fields of image display and information processing in a television and video system, a printer and a copy machine which process tone images.

2. Description of the Related Art

Recently, technical importance of conversion in a picture cell density is increasing with digitization of video apparatus. In IDTV (Improved definition television) and EDTV (Enhanced definition television), a non-interlace display is an important technique. In the case that correlation exists between successive frames such as a static image, the non-interlace display is attained by using the information of the previous frame. On the other hand, in the case that the correlation does not exist between the successive frames, the non-interlace display is attained by interpolating between successive scanning lines in one field. In a similar manner, in a hard copy machine of a video signal such as a video printer, a print engine thereof is configured to record with the number of pixels corresponding to one frame, and the entire data of the frame are recorded when the video signal of a static image is inputted. When the video signal of a moving image is inputted, the number of pixels is converted to a number of pixels corresponding to one frame by interpolating the information in one field and is recorded. As mentioned above, the interpolation for forming one frame from the information of one field is called "field interpolation".

Conventional field interpolation uses a method of linear interpolation of which an average of luminance levels of pixels on upper and lower scanning lines is derived. In this method, resolution can not be enhanced because of the principle of interpolation which creates data of a large number of pixels from information of a small number of pixels. This method purposes to attain smoothness in the image by increasing the number of pixels. In general, an interpolated image is blurred in comparison with the image of one frame obtained without using the interpolation.

The above-mentioned disadvantage is inevitable in the principle. Then, an interpolation method for improving the smoothness of a diagonal line in the image in comparison with the linear interpolation and for realizing a superior vertical resolution to the linear interpolation is investigated by using correlation detection utilizing a statistical characteristic in the image such as continuity.

A typical prior art of the interpolation method comprising the above-mentioned correlation detection is disclosed in the "PHOTOGRAPHIC INDUSTRIES", SHASHIN KOGYO PUBLISHING Co., Ltd., Tokyo, Oct. 1989, pp. 107–108. The prior art is described with reference to figures hereafter.

FIG. 22 is a diagram representing the principle of the interpolation method comprising the correlation detection of the first prior art. Referring to FIG. 22, a line A and a line C are scanning lines which are successively inputted in the same field, and a line B represents a scanning line which is not inputted in this field. Circles on each line represent pixels, and three pixels $A_{n-1}$, $A_n$ and $A_{n+1}$ are located on the line A and three pixels $C_{n-1}$, $C_n$, $C_{n+1}$ are located on the line C.

An attentional pixel to be interpolated is designated by a pixel $B_n$ on the line B. Between the lines A and C, differences $\Delta 1$, $\Delta 2$, $\Delta 3$ of luminance levels of the pixels (hereinafter is referred to as pixel level difference) on interpolation lines L1, L2 and L3 of three directions passing through the attentional pixel $B_n$ are represented by equations (1), (2) and (3), respectively.

$$\Delta 1 = |A_{n-1} - C_{n+1}| \quad (1),$$

$$\Delta 2 = |A_n - C_n| \quad (2),$$

$$\Delta 3 = |A_{n+1} - C_{n-1}| \quad (3).$$

When the difference $\Delta 1$ is the minimum in the differences $\Delta 1$, $\Delta 2$ and $\Delta 3$, a value (average value) derived from equation (4) is selected for an interpolation value $VB_n$ of the pixel $B_n$. Furthermore, when the difference $\Delta 1$ or $\Delta 2$ is the minimum, the value derived from equation (5) or (6) is selected, respectively.

$$VB_n = (A_{n-1} + C_{n+1})/2 \quad (4),$$

$$VB_n = (A_n + C_n)/2 \quad (5),$$

$$VB_n = (A_{n+1} + C_{n-1})/2 \quad (6).$$

Namely, a pixel level difference between the upper pixel $A_n$ and the lower pixel $C_n$ of the attentional pixel $B_n$, a pixel level difference between the upper right pixel $A_{n+1}$ and the lower left pixel $C_{n-1}$ and a pixel level difference between the upper left pixel $A_{n-1}$ and the lower right pixel $C_{n+1}$ are compared with each other. It is determined that the continuity of the image, namely correlation, is high in the direction of the minimum pixel level difference. Therefore, an average value of the levels of the pair of pixels located in the direction is employed for the interpolation value $VB_n$.

In the configuration of the first prior art, in the case that the number of interpolation lines is increased and an interpolation line close to the horizontal line is added for selection, an isolated pixel is liable to be produced as will be described hereafter. An example of the isolated pixel is illustrated in FIG. 23. Referring to FIG. 23, it is provided that pixels $A_{n-2}$, $A_{n-1}$, $A_n$, $A_{n+1}$ and $A_{n+2}$ are low luminance pixels, pixels $C_{n-2}$, $C_{n-1}$, $C_n$, $C_{n+1}$, $C_{n+2}$ and $C_{n+3}$ are medium luminance pixels and pixels $A_{n-3}$, $A_{n+3}$, $C_{n-3}$ are high luminance pixels. The pixel $B_n$ is the attentional pixel. According to the method of the first prior art, the interpolation line connecting the pixels $A_{n+3}$ and $C_{n-3}$ which is close to the horizontal line is selected because of the highest correlation. Consequently, the attentional pixel $B_n$ becomes a high luminance which is greatly different from a circumferential luminance and results in the isolated pixel. Therefore, the method of the first prior art encounters a problem that only the interpolation using upper three pixels $A_{n-1}$, $A_n$, $A_{n+1}$ and lower three pixels $C_{n-1}$, $C_n$, $C_{n+1}$ as shown in FIG. 22 is possible.

A second prior art is disclosed in the Japanese published unexamined patent application Hei 5-153563. According to a correlation detecting interpolation method and apparatus of the second prior art, a fuzzy inference is performed by a fuzzy antecedent part for deriving correlation accuracy every interpolation line and by fuzzy conclusion part representing the direction of an interpolation line. Then, the interpolation line is decided and the interpolation in the direction close to the horizontal line is made possible.

According to the second prior art, in the case that the interpolation lines are fixed (interpolation lines of seven patterns, for example), a superior interpolation characteristic which is resistant to noise is attained by interpolation in the direction close to the horizontal direction in an area having a low horizontal spatial frequency. However, in an area having a high spatial frequency, the fuzzy inference results in erroneous determination, because undesirable information in the direction close to the horizontal direction which is not required to be added to the information (information of level difference) of the interpolation line are included in the input of the fuzzy inference.

Referring to FIG. 24, it is provided that the pixels $A_{n-3}$, $A_{n-1}$, $A_{n+2}$, $C_{n-3}$, $C_{n-1}$, $C_{n+1}$, $C_{n+3}$ are low luminance, and the pixels $A_{n-2}$, $A_n$, $A_{n+1}$, $A_{n+3}$, $C_{n-2}$, $C_n$, $C_{n+2}$ are high luminance and the pixel $B_n$ is the attentional pixel. The horizontal spatial frequency is high in the example of FIG. 24 (variation of luminance is large). According to the second prior art, it is considered that the fuzzy inference results in the direction of the interpolation line connecting pixels $A_{n-2}$ and $C_{n+2}$ or the direction of the interpolation line connecting the pixels $A_{n-1}$ and $C_{n+1}$, and the interpolation value of the pixel $B_n$ is widely changed by choosing either of the two. Moreover, the choice is liable to be influenced by a luminance of the pixel $C_{n+3}$ which is not so considered as to relate to the pixel $B_n$ to be interpolated. Namely, the method of the second prior art is apt to result in erroneous determination by fixing the number of pixels relating to the interpolation.

As mentioned above, the interpolation method by the correlation is beneficial to improve the smoothness of a diagonal line and a vertical resolution in the image in the case that the correlation is detected on the basis of the continuity of the image and the interpolation direction is adequately selected. However, since erroneous detection of the interpolation direction deteriorates an image quality as noise, it is very important to correctly determine the correlation.

In order to obtain a signal of a smooth image similar to the frame signal from an actual field signal, improvement of the correlation detection on an oblique line which is close to the horizontal line is required, and at least seven directions are required as the interpolation directions. In the case that the interpolation is performed in the direction which is closest to the horizontal line, an interval of both pixels used to interpolation is six pixels in the horizontal direction. Therefore, the erroneous interpolation causes large noise or deterioration of a horizontal resolution, and thus erroneous detection of the correlation has to be further reduced.

OBJECT AND SUMMARY OF THE INVENTION

An object of the present invention is to provide a spatial frequency adaptive field-interpolation method and an apparatus therefor, which are capable of interpolating in the direction which is close to the horizontal direction, and which prevent erroneous determination in an interpolation direction even in an image having a high horizontal spatial frequency.

The spatial frequency adaptive field-interpolation method of a first mode in accordance with the present invention is characterized in that plural interpolation lines having different angles passing through an attentional pixel on a scanning line to be interpolated, pixels on an upper scanning line positioned over the attentional pixel and pixels on a lower scanning line positioned under the attentional pixel are set and the scanning line of a video signal is interpolated by interpolating in anyone of directions, and the interpolation is carried out on the scanning line to be interpolated by a spatial frequency detection step for detecting a horizontal spatial frequency in the vicinity of the attentional pixel, plural interpolation direction decision steps for selecting one interpolation line in the interpolation lines on the basis of different algorithms, an interpolation processing selection step for selecting one of the plural interpolation direction decision steps by the spatial frequency information obtained by the spatial frequency detection step, and interpolation pixel forming step for forming the attentional pixel by using the interpolation line obtained by the interpolation direction decision step selected in the interpolation processing selection step.

The spatial frequency adaptive field-interpolation method of a second mode in accordance with the present invention is characterized in that in at least one of pixel group of a pixel group on the upper scanning line and a pixel group of the lower scanning line in the vicinity of the attentional pixel, when the pixel group is divided into a central pixel group in the vicinity of the attentional pixel, a left pixel group placed leftward of the central pixel group and a right pixel group placed rightward of the central pixel group, the spatial frequency detection step in the spatial frequency adaptive field-interpolation method of the first mode further comprises:

- a first level difference detection step for deriving a first level difference between a first representative value of the central pixel group and a second representative value of the left pixel group,
- a second level difference detection step for deriving a second level difference between the first representative value and a third representative value of the right pixel group,
- an average level difference detection step for deriving an average level difference of the first level difference and the second level difference,
- a third level difference detection step for deriving a third level difference between the second representative value and the third representative value, and
- a spatial frequency determination step for forming spatial frequency information by comparing the average level difference with the third level difference.

The spatial frequency adaptive field-interpolation method of a third mode in accordance with the present invention is characterized in that in the spatial frequency adaptive field-interpolation method of the second mode, the spatial frequency determination step derives a ratio of the average level difference to the third level difference, forms spatial frequency information for selecting a first interpolation direction decision step which is high in a discrimination accuracy of an interpolation direction with respect to a first area close to the vertical about the center of the attentional pixel in the case that the ratio is larger than a predetermined first threshold value, and forms spatial frequency information for selecting a second interpolation direction decision step which is high in the discrimination accuracy with respect to a second area close to the horizontal about the center of the attentional pixel in the case that the ratio is the predetermined first threshold value and below.

The spatial frequency adaptive field-interpolation apparatus of a fourth mode in accordance with the present invention is characterized in that interpolation lines in plural directions passing through an attentional pixel to be interpolated on a scanning line, plural pixels on an upper scanning line placed on one side of the scanning line and plural pixels on a lower scanning line placed on the other side of the scanning line are set, and the scanning line of a video signal is interpolated by interpolating in any one of directions, and the apparatus comprises:

- plural interpolation direction decision means for deriving an interpolation line to be interpolated on the basis of different algorithms,
- spatial frequency detection means for detecting a horizontal spatial frequency in the vicinity of the attentional pixel,
- interpolation direction composition means for composing plural interpolation direction signals output from the plural interpolation direction decision means on the basis of the spatial frequency information output from the spatial frequency detection means, and
- interpolation pixel forming means for forming the attentional pixel to be interpolated from an inputted image signal by the interpolation direction composition signal output from the interpolation direction composition means.

The spatial frequency adaptive field-interpolation apparatus of a fifth mode in accordance with the present invention is characterized in that in the spatial frequency adaptive field-interpolation apparatus of the fourth mode, the interpolation direction composition means comprises means for selecting one of plural interpolation direction signals output from the plural interpolation direction decision means based on the different algorithms by the spatial frequency information output from the spatial frequency detection means.

The spatial frequency adaptive field-interpolation apparatus of a sixth mode in accordance with the present invention is characterized in that interpolation lines in plural directions passing through an attentional pixel to be interpolated on a scanning line, plural pixels on an upper scanning line placed over the scanning line and plural pixels on a lower scanning line placed under the scanning line are set, and a scanning line of a video signal is interpolated by interpolating in any one of directions, and the apparatus comprises:

- plural interpolation direction decision means for deriving an interpolation line to be interpolated on the basis of different algorithms,
- plural interpolation pixel forming means for forming an interpolation pixel signal by respective interpolation direction signals output from the plural interpolation direction decision means,
- spatial frequency detection means for detecting a horizontal spatial frequency in the vicinity of the attentional pixel, and
- interpolation pixel composition means for composing the plural interpolation pixel signals output from the plural interpolation pixel forming means on the basis of the spatial frequency information output from the spatial frequency detection means.

The spatial frequency adaptive field-interpolation apparatus of a seventh mode in accordance with the present invention is characterized in that in the spatial frequency adaptive field-interpolation apparatus of the sixth mode, the interpolation pixel composition means comprises means for selecting any one of the plural interpolation pixel signals output from the plural interpolation pixel forming means on the basis of different algorithms on the basis of the spatial frequency information output from the spatial frequency detection means.

The spatial frequency adaptive field-interpolation apparatus of a eighth mode in accordance with the present invention is characterized in that in the spatial frequency adaptive field-interpolation apparatus of one of the fourth, fifth, sixth and seventh modes, the plural interpolation direction decision means comprise first interpolation direction decision means which are high in a discrimination accuracy of a first area close to the vertical about the center of the attentional pixel, and second interpolation direction decision means which are high in a discrimination accuracy of a second area close to the horizontal about the center of the attentional pixel.

The spatial frequency adaptive field-interpolation apparatus of a ninth mode in accordance with the present invention is characterized in that the spatial frequency adaptive field-interpolation apparatus of the eighth mode, the number of interpolation lines which become candidates in the case that the attentional pixel in the first interpolation direction decision means is formed is smaller than the number of interpolation lines which become candidates in the case that the attentional pixel in the second interpolation direction decision means is formed.

The spatial frequency adaptive field-interpolation apparatus of a tenth mode in accordance with the present invention is characterized in that in the spatial frequency adaptive field-interpolation apparatus of one of the fourth, fifth, sixth, seventh, eighth and ninth modes, at least one of the interpolation direction decision means comprises:

- operation means for setting interpolation lines in five or more directions and operating a level difference of two pixels on an interpolation line every interpolation line,
- a fuzzy antecedent part for determining correlation the every interpolation line from the level difference obtained by the operation means,
- a fuzzy conclusion part for deciding a direction to be interpolated from the interpolation lines on the basis of the determination of correlation by the fuzzy antecedent part, and
- the fuzzy conclusion part comprises:
  - first centroid operation means for deriving a direction to be interpolated, and
  - centroid conversion means for converting a centroid of the interpolation direction obtained by the first centroid operation means by a predetermined first function.

The spatial frequency adaptive field-interpolation apparatus of an eleventh mode in accordance with the present invention is characterized in that in the spatial frequency adaptive field-interpolation apparatus of the tenth mode, in the case of application to a low spatial frequency, the predetermined first function which is used in the centroid conversion means is a function having a characteristic to shift to an interpolation direction further close to the horizontal in the case that the centroid of the interpolation direction is an interpolation direction close to the horizontal.

The spatial frequency adaptive field-interpolation apparatus of a twelfth mode in accordance with the present invention is characterized in that in the spatial frequency adaptive field-interpolation apparatus of the tenth mode, in the case of application to a high spatial frequency, the predetermined first function which is used in the centroid conversion means is a function having a characteristic to shift the centroid of the interpolation direction to an interpolation direction close to the vertical.

The spatial frequency adaptive field-interpolation apparatus of a thirteenth mode in accordance with the present invention is characterized in that in the spatial frequency adaptive field-interpolation apparatus of one of the first, second, third, fourth, fifth, sixth, seventh, eighth and ninth modes, one of the interpolation direction decision means comprises:
operation means for setting interpolation lines in five or more directions and for operating a level difference of two pixels on the interpolation line,
a fuzzy antecedent part for determining correlation every interpolation line from the level difference obtained by the operation means, and
a fuzzy conclusion part for deciding a direction to be interpolated from the interpolation lines on the basis of the determination of correlation by the fuzzy antecedent part, and
the fuzzy conclusion part comprises:
second centroid operation means for deriving the direction to be interpolated, and
accuracy sum conversion means for converting sum of accuracy of correlation every the interpolation line which becomes a denominator of centroid operation performed in the second centroid operation means by a predetermined second function.

The spatial frequency adaptive field-interpolation apparatus of a fourteenth mode in accordance with the present invention is characterized in that in the spatial frequency adaptive field-interpolation apparatus of the thirteenth mode, the predetermined second function which is used in the accuracy sum conversion means is a function of which the sum of accuracy is converted to a value of the sum of accuracy or more in the case that the sum of accuracy is smaller than a predetermined second threshold value and convert the sum of accuracy to a value of the sum of accuracy and below in the case that the sum of accuracy is the predetermined second threshold value or more.

The spatial frequency adaptive field-interpolation apparatus of a fifteenth mode in accordance with the present invention is characterized in that in the spatial frequency adaptive field-interpolation apparatus of one of the fourth, fifth, sixth, seventh, eighth, ninth, tenth, eleventh, twelfth, thirteenth and fourteenth modes, the spatial frequency detection means comprises at least one of upper spatial frequency detection means for detecting a horizontal spatial frequency by using a pixel group on the upper scanning line in the vicinity of the attentional pixel and lower spatial frequency detection means for detecting a horizontal spatial frequency by using a pixel group on the lower scanning line in the vicinity of the attentional pixel, and
spatial frequency information to be inputted to the interpolation direction composition means or the interpolation pixel composition means is formed.

The spatial frequency adaptive field-interpolation apparatus of a sixteenth mode in accordance with the present invention is characterized in that in the spatial frequency adaptive field-interpolation apparatus of one of the fourth, fifth, sixth, seventh, eighth, ninth, tenth, eleventh, twelfth, thirteenth, fourteenth and fifteenth modes, the spatial frequency detection means comprises:
an upper spatial frequency detection means for detecting a horizontal spatial frequency by using a pixel group on the upper scanning line in the vicinity of the attentional pixel,
lower spatial frequency detection means for detecting a horizontal spatial frequency by using a pixel group on the lower scanning line in the vicinity of the attentional pixel, and
spatial frequency comparison means for outputting a higher spatial frequency information by comparing upper spatial frequency information output from the upper spatial frequency detection means with lower spatial frequency information output from the lower spatial frequency detection means, and
spatial frequency information to be inputted to the interpolation direction composition means or the interpolation pixel composition means is formed.

The spatial frequency adaptive field-interpolation apparatus of a seventeenth mode in accordance with the present invention is characterized in that in the spatial frequency adaptive field-interpolation apparatus of the sixteenth mode, in a pixel group on the upper scanning line or the lower scanning line on the interpolation line in the vicinity of the attentional pixel, in the case that the pixel group is divided into a central group in the vicinity of the attentional pixel, a left group placed leftward of the central group and a right group placed rightward of the central group, the upper spatial frequency detection means and the lower spatial frequency detection means comprises:
first level difference detection means for deriving a first level difference between a first representative value of the central group and a second representative value of the left group,
second level difference detection means for deriving a second level difference between the first representative value and a third representative value of the right group,
average level difference detection means for deriving an average level difference of the first level difference and the second level difference,
third level difference detection means for deriving a third level difference between the second representative value and the third representative value, and
spatial frequency determination means for forming horizontal spatial frequency information by comparing the average level difference with the third level difference.

By the above-mentioned configurations, effects described hereafter are realizable by the spatial frequency adaptive field-interpolation method and the spatial frequency adaptive field-interpolation apparatus of the present invention.

In the spatial frequency adaptive field-interpolation method of the first mode, first, a horizontal spatial frequency in the vicinity of the attentional pixel is detected by the spatial frequency detection step. One of plural interpolation direction decision steps is selected on the basis of the detected spatial frequency information at the interpolation processing selection step. The higher the spatial frequency of an area is, an interpolation direction decision step having a high discrimination accuracy with respect to an area close to the vertical direction passing through the center of the attentional pixel is selected, and the lower the spatial frequency of the area is, an interpolation direction decision step having a high discrimination accuracy with respect to an area close to the horizontal direction passing through the center of the attentional pixel is selected. The attentional pixel is formed by using the interpolation line decided at the selected interpolation direction decision step at the interpolation pixel forming step. Consequently, erroneous interpolation by the difference of the spatial frequency can be reduced.

In the spatial frequency adaptive field-interpolation method of the second mode, the first level difference of the first representative value of the central group and the second representative value of the left group is derived by the first level difference detection step, the second level difference of the first representative value of the central group and the third representative value of the right group is derived by the second level difference detection step, and the third level difference between the above-mentioned second representative value and the above-mentioned third representative value is derived by the third level difference detection step. The average level difference of the first level difference and the second level difference is derived by the average level difference detection step, and the spatial frequency information is formed by comparing the above-mentioned average level difference with the above-mentioned third level difference in the spatial frequency determination step, namely, detection and determination of the horizontal spatial frequency in the vicinity of the attentional pixel are rationally performed, and the spatial frequency information easily formed.

In the spatial frequency adaptive field-interpolation method of the third mode, the ratio of the above-mentioned average level difference to the third level difference is derived, when the ratio is larger than the predetermined threshold value, the horizontal spatial frequency is determined to be high, and an interpolation line is decided at the first interpolation direction decision step having the high discrimination accuracy in the interpolation direction with respect to the first area which is close to the vertical, and when the ratio is the predetermined threshold value and below, the horizontal spatial frequency is determined to be not high, the interpolation line is decided at the second interpolation direction decision step having the high discrimination accuracy with respect to the second area which is close to the horizontal. By the above-mentioned method, switching operation of the interpolation direction by the spatial frequency information is easily realized, accuracy of the interpolation by the pixel on the upper scanning line and the pixel on the lower scanning line can be improved, and erroneous interpolation can be reduced.

In the spatial frequency adaptive field-interpolation apparatus of the fourth mode, one interpolation line is decided in compliance with each of the algorithms of the plural interpolation direction decision means. Plural interpolation lines are decided as a whole. On the other hand, the horizontal spatial frequency in the proximity of the attentional pixel is detected by the spatial frequency detection means. In the interpolation direction composition means, the interpolation direction composition signal is output by composing plural interpolation direction signals output from the plural interpolation direction decision means. The interpolation direction composition means, the higher the spatial frequency is, composes by weighting an weight in the interpolation direction decided by the interpolation direction decision means of which the discrimination accuracy is high in the area close to the vertical direction passing through the center of the attentional pixel. On the contrary the lower the spatial frequency is, the interpolation direction composition means composes by weighting an weight in the interpolation direction decided by the interpolation direction decision means of which the discrimination accuracy is high in the area close to the horizontal direction passing through the center of the attentional pixel. By the above-mentioned composition, only one interpolation line is finally selected. The attentional pixel is formed from the image signal inputted on the basis of the interpolation direction composition signal by the interpolation pixel forming means.

In the spatial frequency adaptive field-interpolation apparatus of the fifth mode, since one of these interpolation direction signals is selected instead of composition of plural interpolation direction signals output from the plural interpolation direction decision means, the higher the horizontal spatial frequency is, the interpolation direction decided by the interpolation direction decision means having the high discrimination accuracy in the area close to the vertical is selected, and the lower the horizontal spatial frequency is, an interpolation direction decided by the interpolation direction decision means having the high discrimination accuracy in the area close to the horizontal is selected. Since the operation is not composition but merely selection, the configuration is simplified.

In the spatial frequency adaptive field-interpolation apparatus of the sixth mode, one interpolation line is decided in compliance with each of the respective algorithms of the plural interpolation direction decision means. Furthermore, corresponding plural interpolation pixel forming means form interpolation pixel signals by interpolation direction signals from interpolation direction decision means. Plural interpolation pixel signals are formed as a whole. On the other hand, a horizontal spatial frequency in the vicinity of the attentional pixel is detected by the spatial frequency detection means. The interpolation pixel composition means composes plural interpolation pixel signals output from the plural interpolation pixel forming means and outputs a final interpolation pixel signal. The interpolation pixel composition means, the higher the spatial frequency is, composes by weighting an weight of the interpolation pixel decided by the interpolation direction decision means of which a discrimination accuracy is high in the area close to the vertical direction passing through the center of the attentional pixel, on the contrary the lower the spatial frequency is, composes by weighting the weight of the interpolation pixel decided by the interpolation direction decision means of which a discrimination accuracy is high in the area close to the horizontal direction passing through the center of the attentional pixel.

In the spatial frequency adaptive field-interpolation apparatus of the seventh mode, since one of these interpolation direction signals is selected instead of composition of plural interpolation direction signals output from the plural interpolation direction decision means, the higher the horizontal spatial frequency is, the interpolation pixel formed by the interpolation direction signal output from the interpolation direction decision means having the high discrimination accuracy in the area close to the vertical is selected, and the lower the horizontal spatial frequency is, the interpolation direction Formed by the interpolation direction signal output From the interpolation direction decision means having the high discrimination accuracy in the area close to the horizontal is selected. Since the operation is not composition but merely selection, the configuration is simplified.

In the spatial Frequency adaptive field-interpolation apparatus of the eighth mode, the interpolation direction decision means comprises two of the first interpolation direction decision means having the high discrimination accuracy in the first area close to the vertical about the center of the attentional pixel and the second interpolation direction decision means having the high discrimination accuracy in the second area close to the horizontal about the center of the attentional pixel. Consequently, the configuration is simplified by limiting to two as mentioned above.

In the spatial frequency adaptive field-interpolation apparatus of the ninth mode, in configuration of the first interpolation direction decision means, the number of interpolation lines which are candidates of the first interpolation direction decision means is smaller than the number of the interpolation lines which are candidates of the second interpolation direction decision means, and consequently, the interpolation lines selected by the first interpolation direction decision means is limited, and the discrimination accuracy becomes high. For example, the selection of the interpolation line in the area close to the horizontal is prevented by limiting the interpolation line selected by the first interpolation direction decision means to the area close to the vertical.

In the spatial frequency adaptive field-interpolation apparatus of the tenth mode, correlation every interpolation line is determined from the level difference with respect to two pixels on the interpolation line in the fuzzy antecedent part, and the direction to be interpolated is decided from plural interpolation lines on the basis of determination of the correlation in the fuzzy conclusion part. In the decision, the centroid of the interpolation direction obtained by the centroid operation means is converted by the predetermined first function, and the candidates of the direction to be interpolated is suitably adjusted in accordance with various conditions.

Since the accuracy information of each interpolation line is synthetically determined by using the fuzzy inference, there is a tendency as a whole that the centroid is shifted to the central direction. On the other hand, in the case of a low horizontal spatial frequency, there is a tendency that an erroneous selection of the interpolation direction does not arise.

In the spatial frequency adaptive field-interpolation apparatus of the eleventh mode, in the case of the low horizontal spatial frequency, the predetermined first function is made to the function having the characteristic for further shifting the centroid representing the interpolation direction close to the horizontal in the case that the centroid representing the interpolation direction represents an interpolation direction close to the horizontal. The interpolation direction decision means having such centroid conversion means is suitable to the interpolation direction decision means having the high discrimination accuracy in the area close to the horizontal about the center of the attentional pixel.

In the spatial frequency adaptive field-interpolation apparatus of the twelfth mode, in the case of a high horizontal spatial frequency, the above-mentioned predetermined first function is made to the function having the characteristic of which the centroid representing the interpolation direction is shifted to an interpolation direction close to the vertical. The interpolation direction decision means having such centroid conversion means is suitable to the interpolation direction decision means having the high discrimination accuracy in the area close to the vertical about the center of the attentional pixel.

In the spatial frequency adaptive field-interpolation apparatus of the thirteenth mode, the correlation every interpolation line is determined from the level difference with respect to two pixels on the interpolation line in the fuzzy antecedent part, and the direction to be interpolated is decided from plural interpolation lines on the basis of the determination of correlation in the fuzzy conclusion part. In the centroid operation in the decision, the sum of accuracy of the correlation every interpolation line which becomes the denominator of the centroid operation is converted by the predetermined second function prior to the centroid operation. Candidates of the directions to be interpolated can be suitably adjusted in accordance with various conditions.

A small sum of accuracy means a low reliability in all interpolation directions, and a large some of accuracy means that an interpolation direction which is reliable to some degree exists.

In the spatial frequency adaptive field-interpolation apparatus of the fourteenth mode, the above-mentioned predetermined second function is the function that, when the sum of accuracy is smaller than the predetermined second threshold value, the sum of accuracy is converted to the value of the original sum of accuracy or more, and when the sum of accuracy is the predetermined second threshold value or more, the sum of accuracy is converted to the value of the original sum of accuracy and below. Therefore, when the sum of accuracy is small, an interpolation direction close to the vertical is selected, and when the sum of accuracy is large, an interpolation direction close to the horizontal is selected so as to resist to the tendency of which the centroid is shifted to the center due to the characteristic of the fuzzy inference. Consequently, erroneous interpolation is reduced, and moreover an interpolation direction close to the horizontal is also easily selected.

The spatial frequency adaptive field-interpolation apparatus of the fifteenth mode specifies the spatial frequency detection means. The spatial frequency detection means comprises at least one of the upper spatial frequency detection means and lower spatial frequency detection means, and forms only spatial frequency information inputted to the interpolation direction composition means or the interpolation pixel composition means. Both the upper and lower spatial frequency detection means detect the horizontal spatial frequency by using the pixel group on the scanning line in the vicinity of the attentional pixel. In the case that any one of upper and lower is provided, the configuration is simplified. In the case of use of both, the final selection of the interpolation direction is performed in a high accuracy.

The spatial frequency adaptive field-interpolation apparatus of sixteenth mode comprises the upper spatial frequency detection means, the lower spatial frequency detection means, the spatial frequency comparison means for outputting spatial frequency information which is higher by comparison of the upper spatial frequency information and the lower spatial frequency information. For example, these three means are utilized to classify the spatial frequency into the state that at least one of the upper spatial frequency and the lower spatial frequency is the high frequency, the state that both are not high frequencies and at least one is not the high nor the low frequency, the state that both are low frequencies. By using each spatial frequency information classified into three groups, the interpolation direction signal to be output from the interpolation direction composition means or the interpolation pixel signal to be output from the interpolation pixel composition means is utilized to select by classifying into three steps in accordance with the degree of high or low of the spatial frequency.

In the spatial frequency adaptive field-interpolation apparatus of the seventeenth mode, the first level difference detection means derives the first representative value of the central group, the second representative value of the left group, and the second level difference detection means derives the second level difference of the first representative value of the central group and the third representative value of the right group, and the third level difference detection means derives the third level difference of the second representative value and the third representative value. The average level difference detection means derives the average level difference of the first level difference and the second level difference, and the spatial frequency determination means forms the spatial frequency information by comparing the average level difference and the third level difference. Namely, the detection and determination of the horizontal spatial frequency in the vicinity of the attentional pixel is rationally performed, and the spatial frequency information is easily performed.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIGS. 6A through 6H represents diagrams illustrating first and second membership functions in the antecedent operation circuit 71 in FIG. 4;

FIG. 18 is a block diagram of an interpolation pixel forming circuit 5;

It will be recognized that some or all of the Figures are schematic representations for purposes of illustration and do not necessarily depict the actual relative sizes or locations of the elements shown.

DESCRIPTION OF THE PREFERRED EMBODIMENTS

[First Embodiment]

Figure 1:
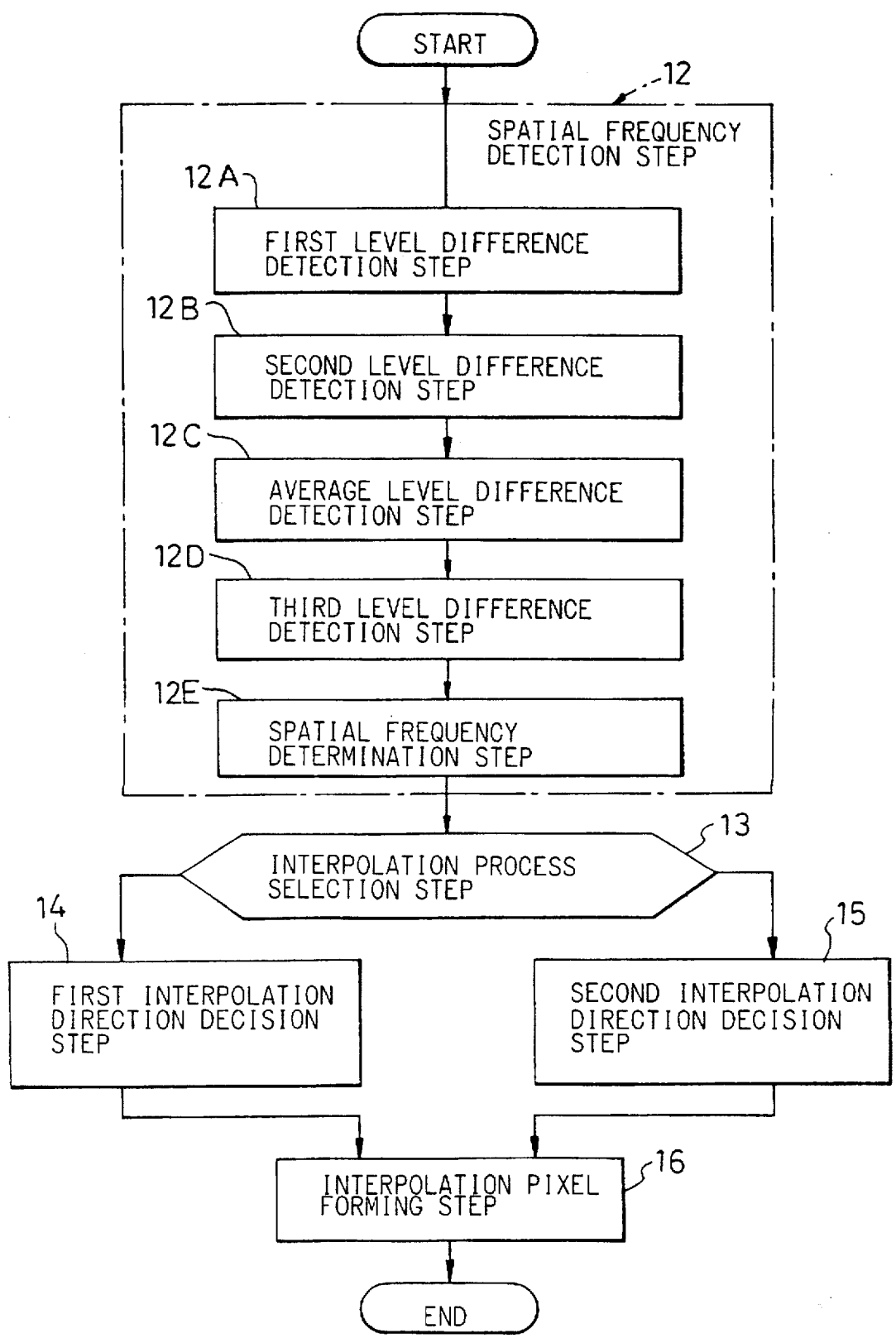
FIG. 1 is a flow chart representing process of the spatial frequency adaptive field-interpolation method of a first embodiment of the present invention.

FIG. 1 is a flow chart representing a process of the spatial frequency adaptive field-interpolation method in the first embodiment of the present invention. First, a horizontal spatial frequency in the vicinity of an attentional pixel is evaluated at a spatial frequency detection step 12. Subsequently, at an interpolation process selection step 13, an interpolation process which is suitable to the spatial frequency in the obtained horizontal spatial frequency information is selected. When the horizontal spatial frequency is higher than a predetermined value, the flow advances to a first interpolation direction decision step 14, and an interpolation direction is derived by a first interpolation direction decision method. The interpolation direction represents the direction of an interpolation line, and shows the direction of a line passing through the attentional pixel and two pixels giving information for interpolating the attentional pixel. Moreover, when the horizontal spatial frequency is not higher than the predetermined value, the flow advances to a second interpolation direction decision step 15, and the interpolation direction is derived by a second interpolation direction decision method. At an interpolation pixel forming step 16, an interpolation pixel is formed on the basis of information of the interpolation direction obtained by the first interpolation direction decision step 14 or the second interpolation direction decision step 15.

Figure 2:
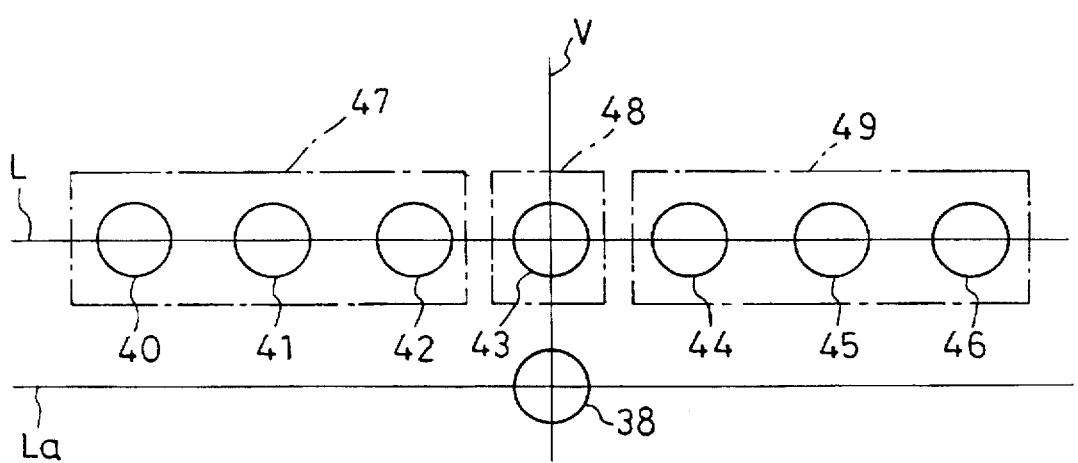
FIG. 2 is a diagram representing a method for detecting a horizontal spatial frequency of the first embodiment.

FIG. 2 is a diagram illustrating a method for detecting a horizontal spatial frequency. Referring to FIG. 2, circles represent pixels 40–46 on an upper scanning line L placed over an attentional pixel 38 on a scanning line La. The pixel 43 is located on a vertical line V (vertical interpolation line). The pixels 40–46 can be placed on a lower scanning line placed under the attentional pixel 38, in this case, the attentional pixel 38 is located over the pixel 43 in FIG. 2 (not shown).

First, the pixels 40–46 on the scanning line L are divided into three groups. In this embodiment, three groups comprise a central group 48, a left group 47 having the pixels 40–42 located leftward of the central group 48 and a right group 49 having the pixels 44–46 located rightward of the central group 48. Subsequently, representative values of three groups are evaluated. In this embodiment, the representative value of the central group 48 (hereinafter is referred to first representative value 48V) is represented by the level (luminance value, for example) of the pixel 43. The representative value of the left group 47 (hereinafter is referred to as second representative value 47V) is represented by the level of the pixel 40 and the representative value of the right group 49 (hereinafter is referred to as third representative value 49V) is represented by the level of the pixel 46. Incidentally, the second representative value 47V can be represented by the level of the pixel 41 and the third representative value 49V can be represented by the level of the pixel 45. Moreover, an average level or a median level of each group can be used for the representative value.

Detection of the spatial frequency at the spatial frequency detection step 12 (FIG. 1) is described in detail hereafter.

A first level difference between the first representative value 48V and the second representative value 47V is derived, and a second level difference between the first representative value 48V and third representative value 49V is derived at a first level difference detection step 12A and a second level difference detection step 12B in FIG. 1, respectively. Subsequently, an average of two level differences (hereinafter is referred to as a center change level) is derived at an average level difference detection step 12C. Moreover, a third level difference between the second representative value 47V and third representative value 49V (hereinafter is referred to as both ends change level) is derived at a third level difference detection step 12D. The center change level is compared with the both ends change level, and a horizontal spatial frequency in the vicinity of the attentional pixel is determined at a spatial frequency determination step 12E.

In this embodiment, one of a first interpolation direction decision method and a second interpolation direction decision method is selected as will be described hereafter. Therefore, the horizontal spatial frequency is classified into two spatial frequency groups. On a scanning line of at least one of the upper and lower scanning lines of the attentional pixel, when the center change level is larger than the both ends change level, the spatial frequency is determined to be in the first spatial frequency group, and in the other case, the spatial frequency is determined to be in the second spatial frequency group. For example, in the case of the example shown in FIG. 23, the center change level on the upper scanning line A is larger than the both ends change level. Consequently, the spatial frequency belongs to the first spatial frequency group.

In the case that the spatial frequency in the vicinity of the attentional pixel belongs to the first spatial frequency group, the first interpolation direction decision method is selected, and in the other case, the second interpolation direction decision method is selected.

In the second interpolation direction decision method, an interpolation method which is suitable to the case that the horizontal spatial frequency is low is used. For example, in the correlation detection interpolation method disclosed in the second prior art, there is a method performing fuzzy inference including an interpolation line close to the horizontal.

An interpolation method which is suitable to the case of a high horizontal spatial frequency is applied to the first interpolation direction decision method. For example, the method shown in the first prior art is usable. Moreover, in the correlation detection interpolation method in the second prior art, the method performing fuzzy inference of which the number of candidates of interpolation lines is reduced is applicable to the first interpolation direction decision method.

Moreover, fuzzy inference comprising function for correcting an interpolation direction (centroid conversion means, accuracy sum conversion means) which will be described hereafter is applicable to the first or the second interpolation direction decision method.

In the case that an interpolation pixel is formed by using an interpolation line (interpolation direction) obtained by the first interpolation direction decision method or the second interpolation direction decision method, erroneous interpolation is reduced, and the interpolation in the direction close to the horizontal direction is attainable.

In the first embodiment, in the detection of the horizontal spatial frequency, the pixels on the scanning line are divided into three groups, and the spatial frequency is derived by using the level difference between the representative values of these groups. However, the embodiment is limited to the above-mentioned method, and there is a method to derive a horizontal spatial frequency by using a band-pass filter. Moreover, the method for dividing the pixels and the method for determining the representative values are also not limited to the above-mentioned methods of the present embodiment, and the central group can be composed of three pixels or an average can be used for the representative values. Moreover, classification on the basis of the horizontal spatial frequency can be more accurately performed by using a plurality of representative values.

Moreover, though two interpolation direction decision methods are prepared in this embodiment, the number thereof is not limited to two, and can be two or more. Incidentally, in this case, the number of the spatial frequency groups to be classified also increases. Moreover, the interpolation direction decision method is not limited to the method as shown in this embodiment°

In the first embodiment, though the center change level is merely compared with the both ends change level and the interpolation direction decision method is decided, a ratio of the center change level to the both ends change level or a ratio of the both ends change level to the central change level is derived, and the interpolation direction decision method can be selected by using a comparison result of the ratio with a predetermined first threshold value.

[Second Embodiment]

Figure 3:
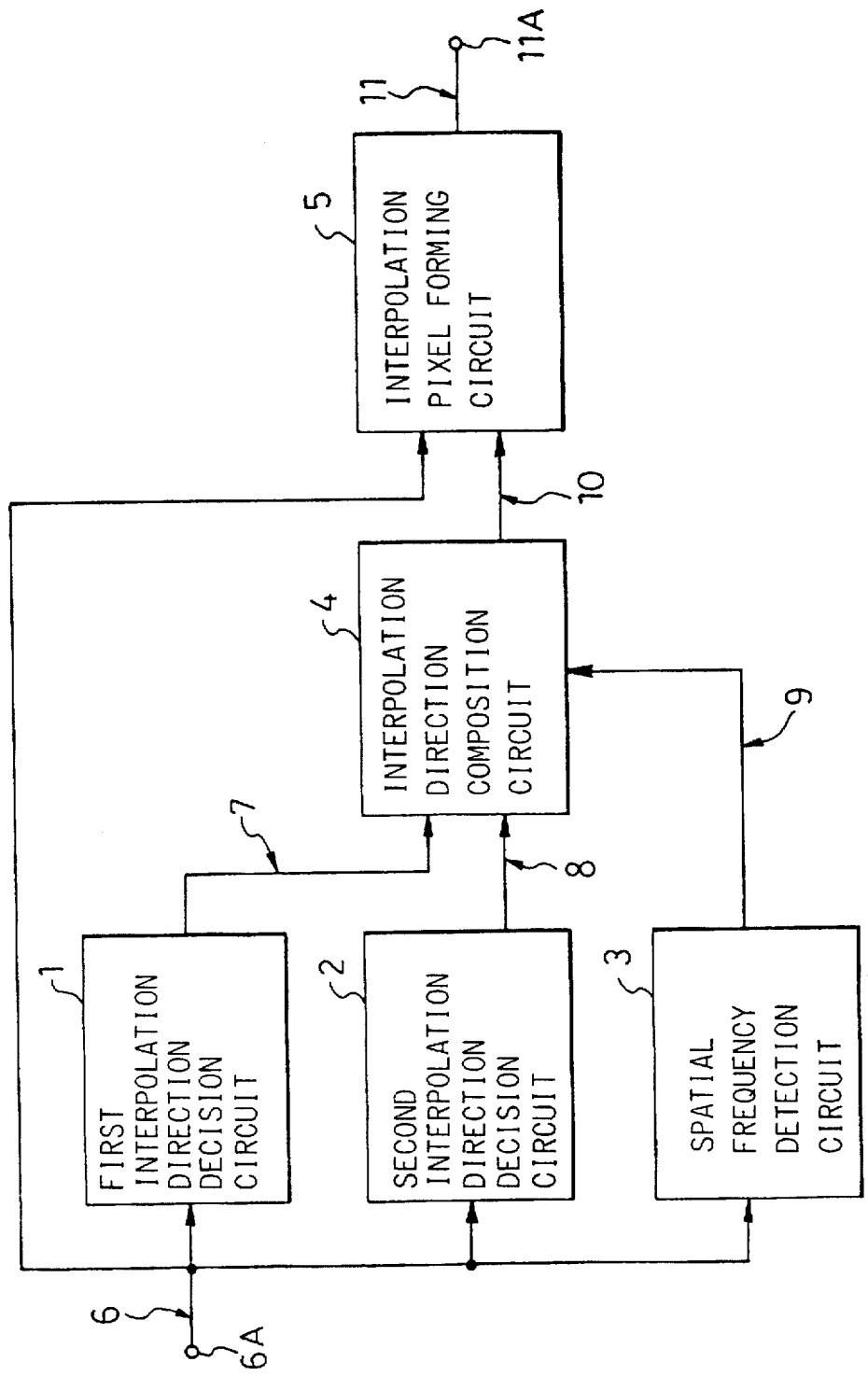
FIG. 3 is a block diagram of the spatial frequency adaptive field-interpolation apparatus of a second embodiment of the present invention.

FIG. 3 is a block diagram of the spatial frequency adaptive field-interpolation apparatus of the second embodiment of the present invention. Referring to FIG. 3, the spatial frequency adaptive field-interpolation apparatus comprises a first interpolation direction decision circuit 1, a second interpolation direction decision circuit 2, a spatial frequency detection circuit 3, an interpolation direction composition circuit 4 and an interpolation pixel forming circuit 5. The first interpolation direction decision circuit 1 is suitable to the case that the horizontal spatial frequency is higher than a predetermined value, and the second interpolation direction decision circuit 2 is suitable to the case that the spatial frequency is the predetermined value and below.

First, an image signal 6 is inputted to the first interpolation direction decision circuit 1 and a first interpolation direction is decided. Simultaneously the image signal 6 is inputted to the second interpolation direction decision circuit 2 and a second interpolation direction is decided. Moreover, the image signal 6 is also inputted to the spatial frequency detection circuit 3. In the spatial frequency detection circuit 3, the horizontal spatial frequency in the vicinity of the attentional pixel is detected, and spatial frequency information 9 is output. In the interpolation direction composition circuit 4, the first interpolation direction signal 7 and the second interpolation direction signal 8 are composed by using the spatial frequency information 9. Incidentally, either one of the first interpolation direction signal 7 and the second interpolation direction signal 8 can be selected as replacement for the composition of the interpolation direction signals 7 and 8 by the interpolation direction composition circuit 4. An interpolation direction composition signal 10 composed by the interpolation direction composition circuit 4 is inputted to the interpolation pixel forming circuit 5o In the interpolation pixel forming circuit 5, an interpolation pixel signal 11 is formed from the image signal 6 by using the inputted interpolation direction composition signal 10.

Figure 4:
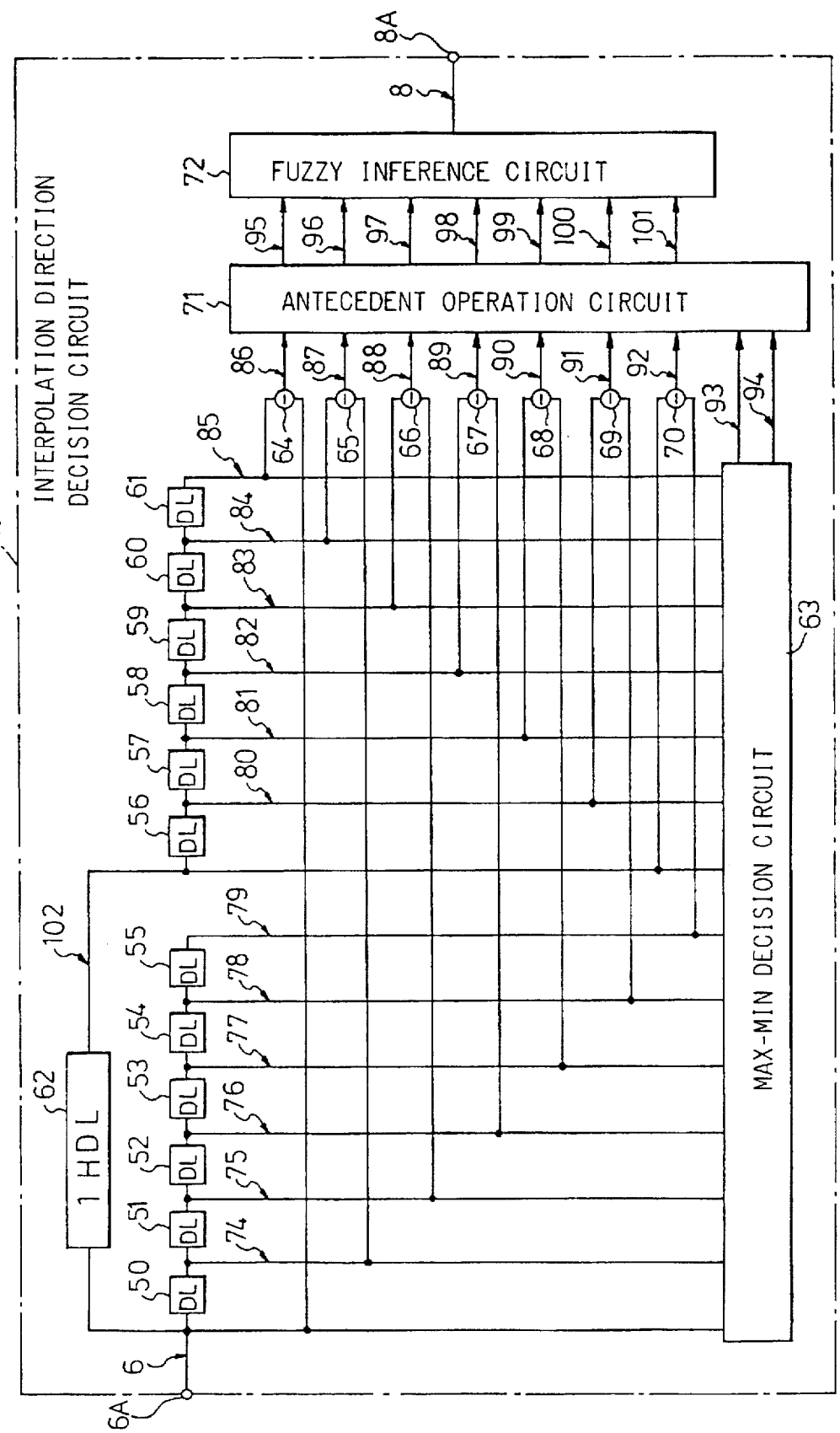
FIG. 4 is a block diagram of an interpolation direction decision circuit in the second embodiment of the present invention.

FIG. 4 is a block diagram which is common to the first and second interpolation direction decision circuits 1 and 2 in the spatial frequency adaptive field-interpolation apparatus of the second embodiment. Referring to FIG. 4, the first interpolation direction decision circuit 1 or the second interpolation direction decision circuit 2 can be structured by providing a centroid conversion circuit 139 (or accuracy sum conversion circuit) in a fuzzy inference circuit 72 as will be described later.

The interpolation direction decision circuits 1 and 2 comprise delay circuits 50–61 for delaying a time length of one pixel, subtraction circuits 64–70 for detecting a correlation value by calculating a level difference between the pixels on an interpolation line, a vertical delay circuit 62 for delaying a time period of one scanning line, a MAX-MIN decision circuit 63 for deriving a maximum value and a minimum value of inputted data, an antecedent operation circuit 71 of fuzzy inference for deriving a correlation accuracy and a fuzzy inference circuit 72 (fuzzy conclusion part) for performing the fuzzy inference by the correlation accuracy.

A decision method of the interpolation direction using fuzzy inference in the present embodiment is described hereafter. The fuzzy inference operation is divided into a fuzzy antecedent part and a fuzzy conclusion part. First of all, the fuzzy antecedent part is described. A fuzzy rule (rule of "if—then") used in the fuzzy inference of the embodiment comprises the following two fuzzy rules:

fuzzy rule (1): in the case of an interpolation direction which is relatively close to the vertical, if:

a level difference of a pair of pixels in a direction is small, then:

correlation in the direction is high, (an accuracy of which the direction is the interpolation direction is high).

fuzzy rule (2): in the case of an interpolation direction which is relatively close to the horizontal, if:

a level difference of a pair of pixels in the direction is small, and a level difference of a pair of pixels in an opposite direction is large, then:

correlation in the direction is high.

Figure 23:
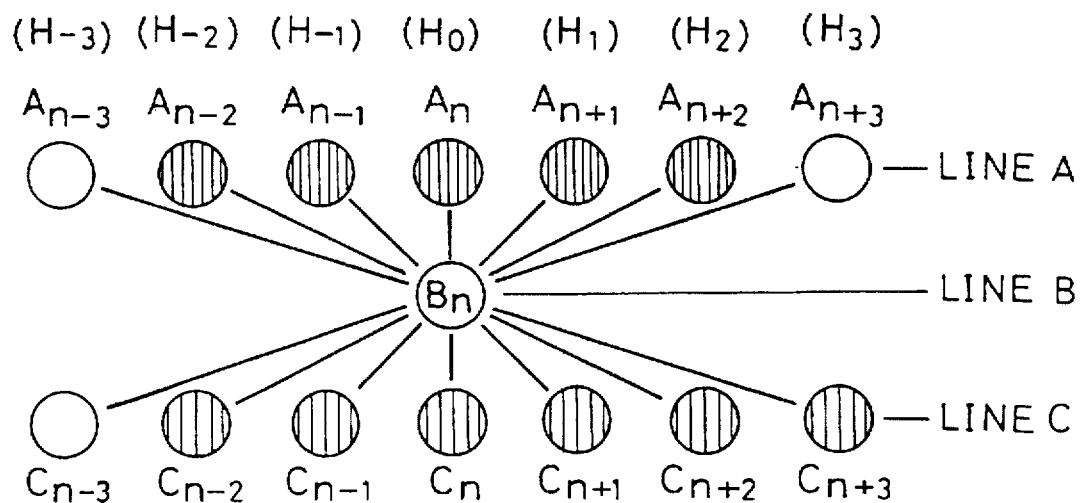
FIG. 23 is the diagram illustrating occurrence of erroneous interpolation in the prior art.

In the embodiment, in FIG. 23, pairs of pixels in the interpolation directions belonging to the fuzzy rule (1) are designated by $(A_{n-1}, C_{n+1})$, $(A_n, C_n)$ and $(A_{n+1}, C_{n-1})$. Moreover, pairs of pixels in the interpolation directions belonging to the fuzzy rule (2) are designated by $(A_{n-3}, C_{n+3})$, $(A_{n-2}, C_{n+2})$, $(A_{n+2}, C_{n-2})$ and $(A_{n+3}, C_{n-3})$ Pairs of pixels in the opposite directions of the pairs $(A_{n-3}, C_{n+3})$ and $(A_{n-2}, C_{n+2})$ are designated by $(A_{n+1}, C_{n-1})$, $(A_{n+2}, C_{n-2})$ and $(A_{n+3}, C_{n-3})$. Pairs of pixels in the opposite directions of the pairs $(A_{n+2}, C_{n-2})$ and $(A_{n+3}, C_{n-3})$ are designated by $(A_{n-1}, C_{n+1})$, $(A_{n-2}, C_{n+2})$ and $(A_{n-3}, C_{n+3})$.

Moreover, examples of membership functions representing a correlation accuracy which is obtained by smallness of the level difference of the pair of pixels in a direction are shown by FIGS. 6A through 6D. FIGS. 6A through 6H will be described in detail hereinafter. Referring to FIGS. 6A through 6H, abscissa in each diagram designates a level difference of a pair of pixels in each direction, and ordinate in each diagram designates a height of correlation (accuracy information). A level difference in each direction of abscissa is normalized to a value of 0–1. As is apparent from FIG. 6A, the smaller the difference in the direction becomes, the higher the correlation becomes.

In the case of the fuzzy rule (1), the accuracy information is formed by using only a membership function representing the correlation accuracy. In the case of the fuzzy rule (2), the accuracy information in each direction is formed by using fuzzy logical product (MIN operation selecting what is the lowest correlation) from both the membership functions representing the correlation accuracy and non-correlation accuracy. In the case of the fuzzy rule (2), since plural opposed directions exist with respect to each direction, plural membership functions representing non-correlation accuracy are used.

The interpolation line having a highest correlation is decided on the basis of the obtained accuracy information by the above-mentioned fuzzy antecedent operation. The fuzzy conclusion part will be described hereinafter.

Operation of the apparatus including the antecedent operation circuit 71 is described with reference to FIG. 4, FIG. 5, FIGS. 6A through 6H and FIG. 23. The image signal 6 inputted from the image signal input terminal is converted to information of 7 pixels $C_{n-3}$, $C_{n-2}$, $C_{n-1}$, $C_n$, $C_{n+1}$, $C_{n+2}$ and $C_{n+3}$ on the line C as shown in FIG. 23 by the horizontal delay circuits 50–55. In a similar manner, the image signal 6 is converted to information of 7 pixels $A_{n-3}$, $A_{n-2}$, $A_{n-1}$, $A_n$, $A_{n+1}$, $A_{n+2}$ and $A_{n+3}$ on the line A as shown in FIG. 23 by the vertical delay circuit 62 and the horizontal delay circuits 56–61. Level differences in respective directions are derived by performing subtraction operation between the pixels on the line A and the pixels on the line C by the subtraction circuits 64–70. The level difference of the pair of the pixels $(A_{n-3}, C_{n+3})$ in FIG. 23 is derived by the subtraction circuit 64. Moreover, the level difference of the pair of the pixels $(A_{n-2}, C_{n+2})$ is derived by the subtraction circuit 65. In a similar manner, the level differences 88–92 of the pairs of pixels in every direction are derived by the subtraction circuits 66–70, respectively.

Moreover, in the MAX-MIN decision circuit 63, a maximum value 93 and a minimum value 94 are derived from the information of the pixels (image signals 6, 74–85 and 102).

In the antecedent operation circuit 71, accuracy information 95–101 of the correlation every interpolation line are attained by using the level differences 86–92 of every interpolation line derived by the subtraction circuits 64–70 and the maximum value 93 and the minimum value 94 derived by the MAX-MIN decision circuit 63. The accuracy information 95–101 indicate data or a value representing accuracy or reliability in the correlation.

Furthermore, in the fuzzy inference circuit 72 (fuzzy conclusion part), the fuzzy inference is carried out on the basis of the accuracy information 95–101, and an interpolation line having a highest correlation is decided.

Figure 5:
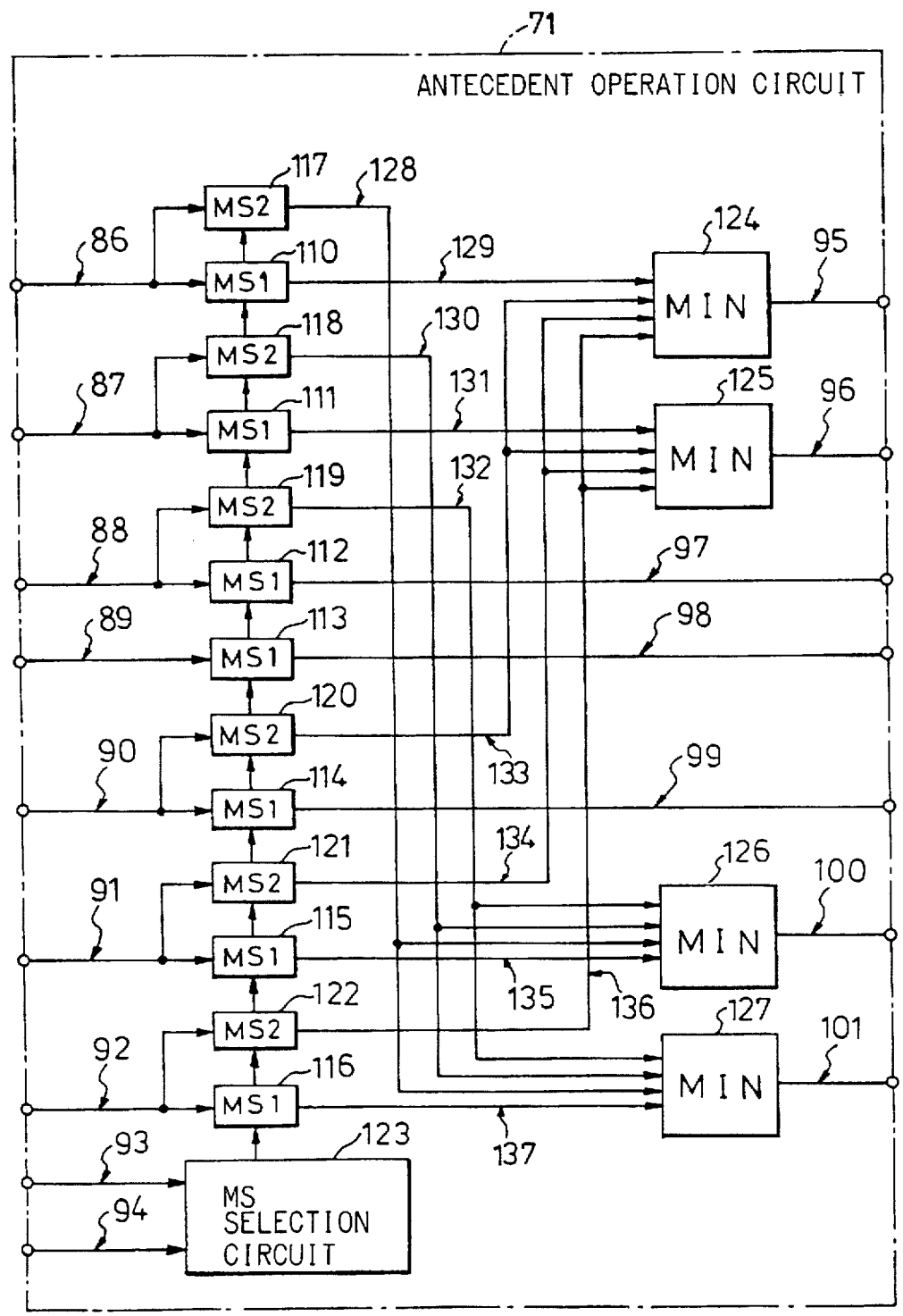
FIG. 5 is a block diagram of an antecedent operation circuit 71 in FIG. 4.

FIG. 5 is a block diagram of the antecedent operation circuit 71. In a membership function selection circuit 123 (MS selection circuit 123 in FIG. 5), a table of a membership function having a most similar shape to the diagram of a function of which the second membership function is normalized by the maximum value 93 and the minimum value 94 is selected.

The first membership functions (MS1 in FIG. 5) 110–116 representing correlation accuracy are 64 kinds of functions such as several examples shown by FIGS. 6A, 6B, 6C and 6D, and an optimum table is selected from these functions by the membership function selection circuit 123.

Moreover, second membership functions (MS2 in FIG. 5) 117–122 representing non-correlation accuracy are 64 kinds of functions such as several examples shown by FIGS. 6E, 6F, 6G and 6H. These FIGS. 6E, 6F, 6G and 6H represent non-correlation accuracy. Therefore, when the level difference between two pixels of a pair in an opposite direction is large, the correlation accuracy becomes high, and when the level difference between two pixels of the pair is small, the correlation accuracy is lowered. In a similar manner to the first membership functions, an optimum table is selected from these functions by the membership function selection circuit 123.

MINs 124–127 are fuzzy logical product operation circuits for performing fuzzy logical product operation (MIN operation). In the MINs 124–127, fuzzy logical product is operated every interpolation line with respect to the outputs of the first and second membership function tables, and correlation accuracy for every interpolation line is derived.

Hereafter, operation in the antecedent operation circuit 71 is described in detail.

First, in the membership function selection circuit 123, information of high order 3 bits of the maximum value 93 and high order 3 bits of the minimum value 94 output from the MAX-MIN decision circuit 63 in FIG. 4 are decoded. Subsequently, the table of a membership function which is most similar to the shape of the function in the case that the first and second membership functions are normalized by the maximum value 93 and the minimum value 94 is selected from the 64 kinds of the first membership functions and the 64 kinds of the second membership functions. Level difference signals 86–92 output from the subtraction circuits 64–70 in FIG. 4 are looked up in the tables of the derived membership functions, and as shown in FIG. 5, correlation accuracies 97, 98, 99,129,131, 135 and 137 and non-correlation accuracies 128, 130, 132, 133, 134 and 136 are obtained. The fuzzy logical product (MIN operation) are derived by using these accuracies by the MINs 124–127, and accuracy information 95–101 in the respective interpolation directions are derived.

Figure 7A:
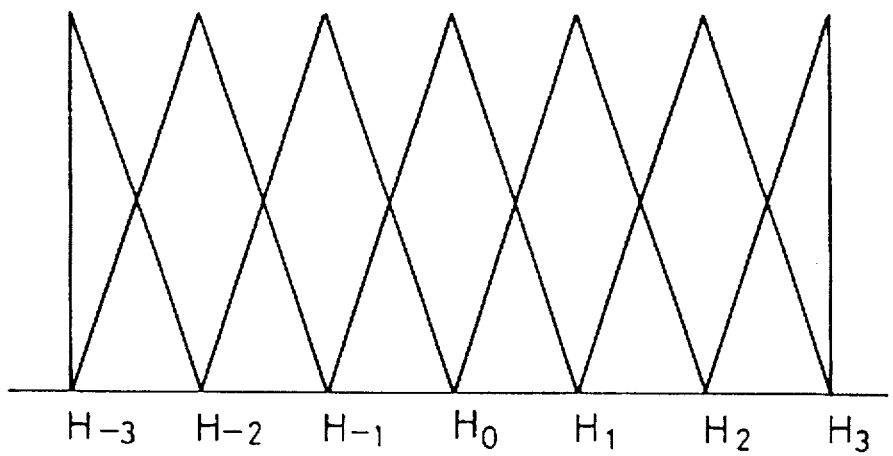
FIG. 7A is a diagram illustrating membership functions of a fuzzy conclusion part in a fuzzy inference circuit 72 in FIG. 4.

Subsequently, operation of the fuzzy inference circuit 72 (fuzzy conclusion part) is described. First, FIG. 7A is a diagram representing membership functions of the fuzzy conclusion part representing the direction of an interpolation line. Referring to FIG. 7A, a diagram $H_{-3}$ illustrates the membership function of a right-angled triangle in the conclusion part representing the direction of an interpolation line connecting the pixels ($A_{n-3}$ and $C_{n+3}$) in FIG. 23. Moreover, diagrams $H_{-2}$, $H_{-1}$, $H_0$, $H_1$ and $H_2$ illustrate the membership functions of isosceles triangles in the conclusion part representing the direction of interpolation lines connecting both pixels of each pair of pixels ($A_{n-2}$ and $C_{n+2}$), ($A_{n-1}$ and $C_{n+1}$), ($A_n$ and $C_n$), ($A_{n+1}$ and $C_{n-1}$) and ($A_{n+2}$ and $C_{n-2}$), respectively. In a similar manner, diagram $H_3$ illustrates the membership function of a right-angled triangle in the conclusion part representing the direction of an interpolation line connecting the pixels ($A_{n+3}$ and $C_{n-3}$). The designations $H_-$, $H_{-2}-$, $H_3$ are put on the base line of the diagram of FIG. 7A at the parts under respective peaks of the triangles.

Figure 7B:
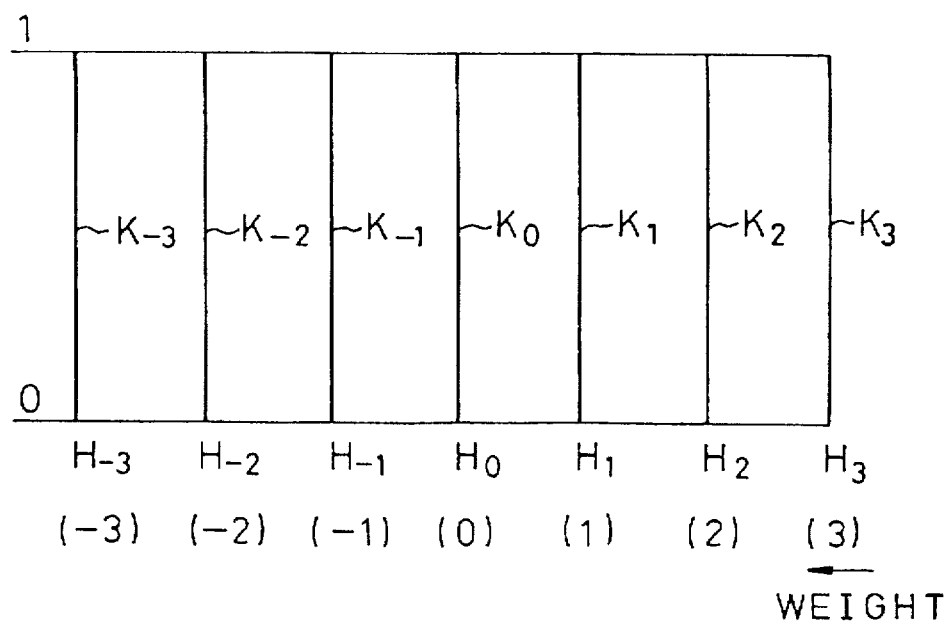
FIG. 7B is a diagram illustrating membership functions of the fuzzy conclusion part in the fuzzy inference circuit 72 in FIG. 4.

In the second embodiment, for simplicity of calculation, a simplified fuzzy inference operation of which the conclusion part of the fuzzy control rule are integers is performed by using the membership functions simplified as shown in FIG. 7B. Referring to FIG. 7B, straight lines $K_{-3}$, $K_{-2}$, $K_{-1}$, $K_0$, $K_1$, $K_2$ and $K_3$ having a grade 1 and are weighted with −3, −2, −1, 0, 1, 2 and 3, respectively are used for membership functions. Then a centroid is derived on the basis of these membership functions.

Figure 8:
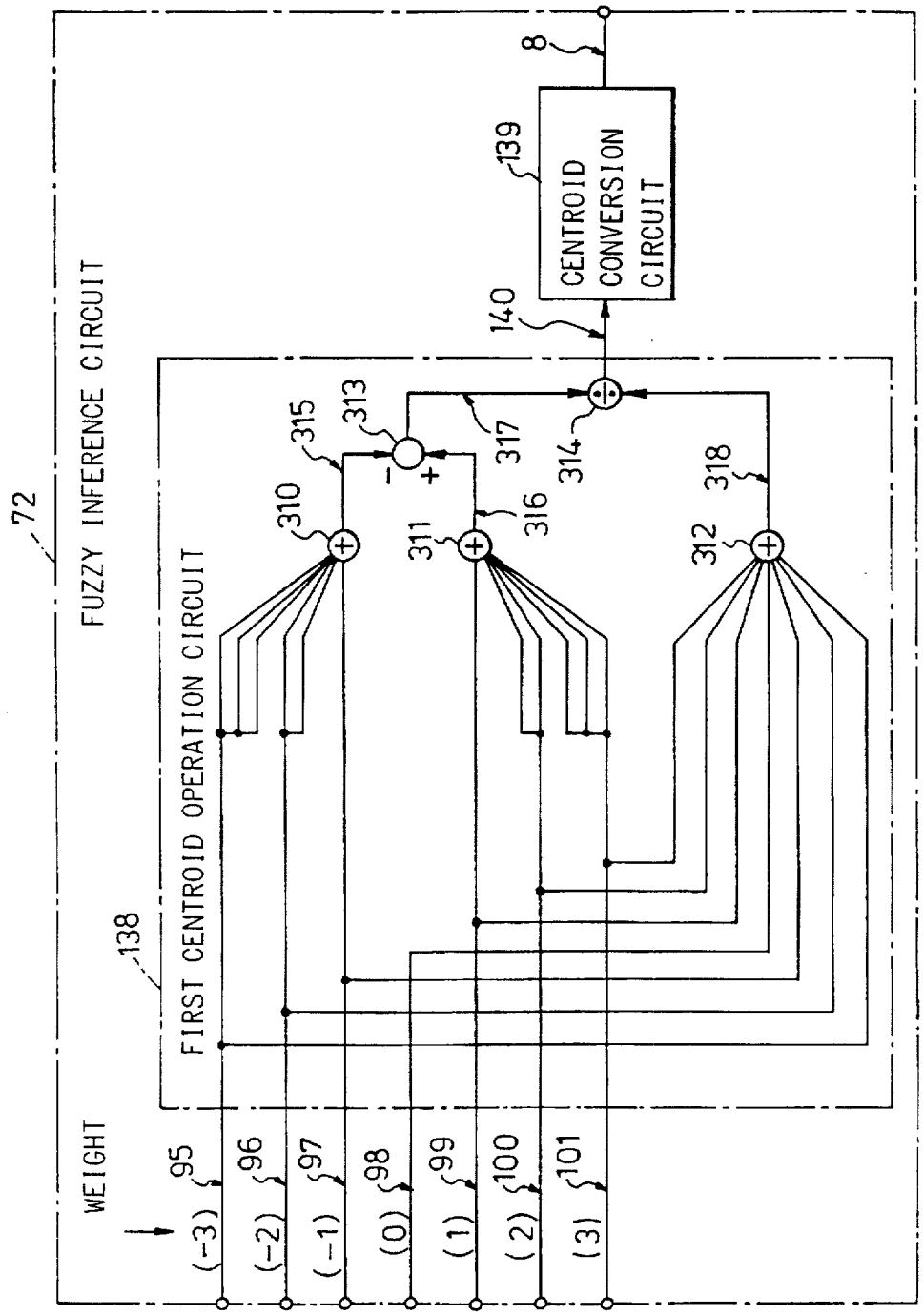
FIG. 8 is a block diagram of a fuzzy inference circuit 72 in FIG. 4.

FIG. 8 is a block diagram of the fuzzy inference circuit 72 (fuzzy conclusion part). The fuzzy inference circuit 72 comprises a first centroid operation circuit 138 and a centroid conversion circuit 139.

The first centroid operation circuit 138 comprises multi-input addition circuits 310–312 having a plurality of input terminals, a subtraction circuit 313 and a division circuit 314. Three parallel input lines having the accuracy signal 95 output from the antecedent operation circuit 71 (FIG. 4) are coupled to the multi-input addition circuit 310 so that the same effect as triplication of the value of the inputted accuracy signal 95 is attained. In a similar manner, two parallel input lines having the accuracy signal 96 are coupled to the multi-input addition circuit 310 so that the same effect as double of the value of the inputted accuracy signal 96 is attained. Consequently, the triple value of the accuracy signal 95, the double value of the accuracy signal 96 and the value of the accuracy signal 97 are added in the multi-input addition circuit 310. In a manner similar to the above-mentioned calculation, three parallel signal lines having the accuracy signal 101 equal to triplication of intensity, two parallel signal lines having the accuracy signal 100 thereby equal to double of intensity and one signal line of the accuracy signal 99 are coupled to the multi-input addition circuit 311, and are added thereby. In the subtraction circuit 313, a signal 315 output from the multi-input addition circuit 310 is subtracted from a signal 316 output from the multi-input addition circuit 311. Incidentally, since the weight ($H_0$) of the accuracy signal 98 is zero times as shown in FIG. 7B, neither addition nor subtraction is performed.

Moreover, a total sum 318 of the accuracy signals 95–101 is derived by the multi-input addition circuit 312. Consequently, the centroid is derived by dividing the output 317 of the subtraction circuit 313 by the output 318 of the multi-input addition circuit 312 in the division circuit 314.

In the second embodiment, the centroid conversion circuit 139 is realized by a look-up table (not shown).

Figure 9A:
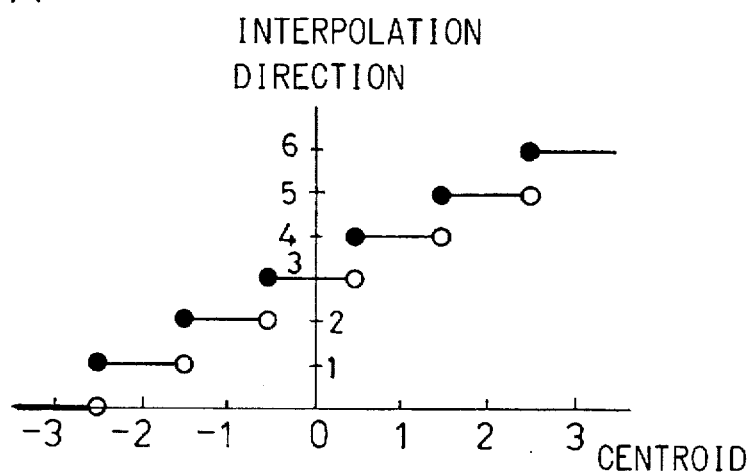
FIG. 9A, FIG. 9B and FIG. 9C are diagrams illustrating characteristics of tables deciding interpolation directions in a centroid conversion circuit 139 in FIG. 8.
Figure 9B:
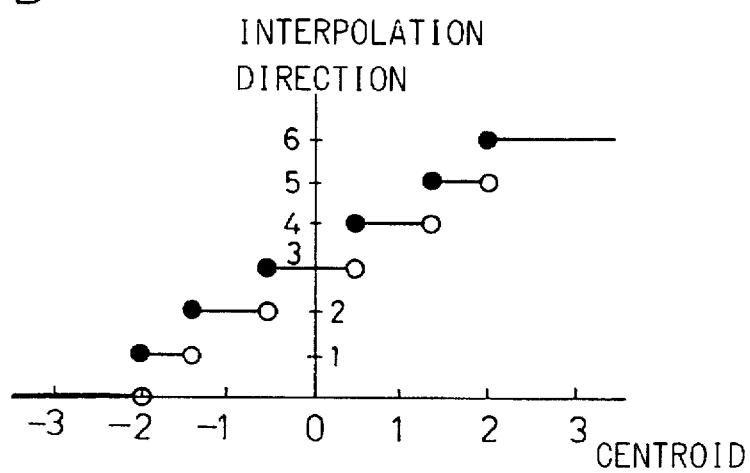
Figure 9C:
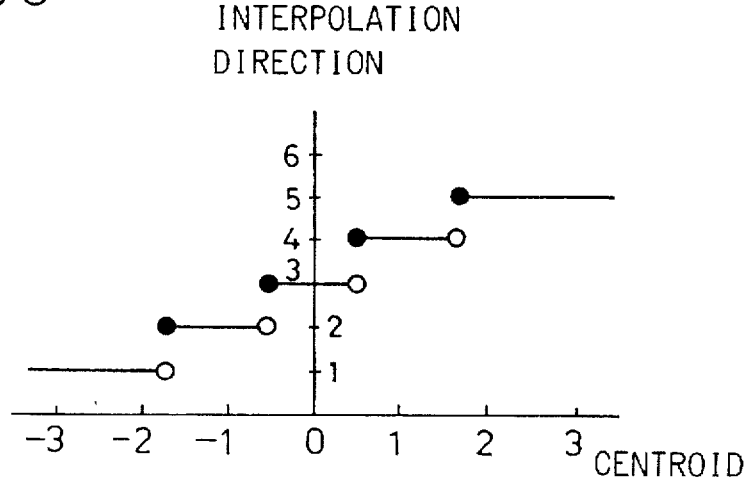
Figure 10A:
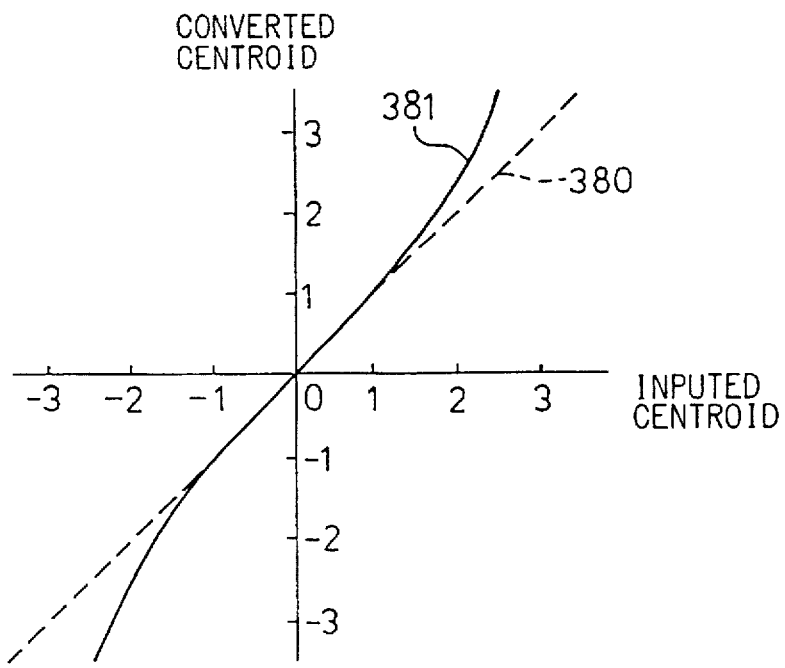
FIG. 10A and FIG. 10B are diagrams illustrating conversion methods of the centroid in the centroid conversion circuit 139 in FIG. 8.
Figure 10B:
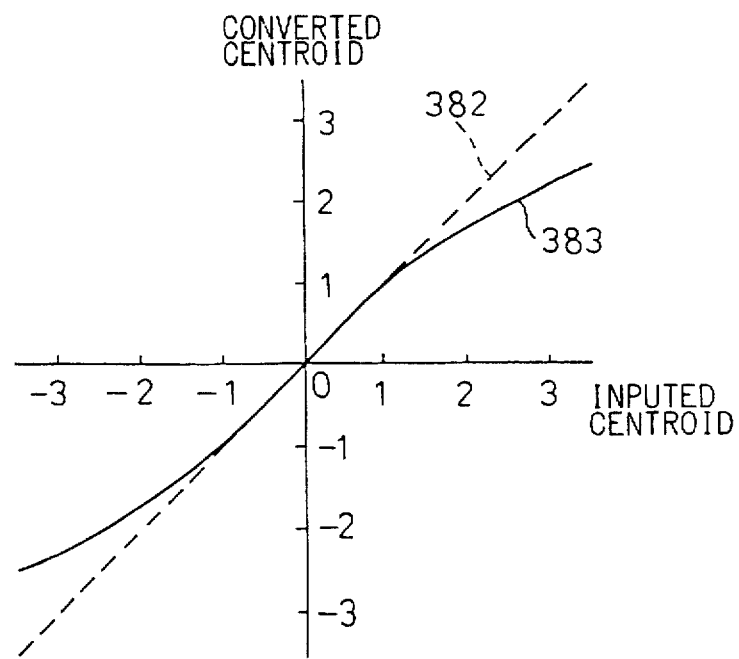

FIG. 10A and FIG. 10B are diagrams illustrating conversion methods of the centroid. Referring to FIG. 10A and FIG. 10B, abscissa designates an input value of the centroid and ordinate designates an output of a converted centroid. Functions shown by a broken line 380 and a broken line 382 represent the cases of which the centroid are not changed. In the centroid conversion circuit 139, first, the centroid is converted by the function represented by a curve 381. Subsequently, a constant value 3.5 is added to each of values −3, −2, −1, 0, 1, 2, 3 representing derived new centroids, and number below the decimal point of each value of the new centroids is discarded. Consequently, values "0", "1", "2", "3", "4", "5" and "6" representing interpolation lines in seven directions are derived. A look-up table for realizing composition of the above-mentioned two processings has a characteristic as shown in the diagram of FIG. 9B. In coordinates of the diagrams of FIG. 9B described above and FIG. 9A and FIG. 9C which will be described below, ends shown by black dots (hereafter black dot ends) of segments have values of the coordinates and ends shown by white dots (hereafter white dot ends) of the segments do not have values of the coordinates.

The function represented by the curve 381 in FIG. 10A has a characteristic to shift the centroid into a direction so that the interpolation direction becomes close to the horizontal direction. Therefore, in the case that the inputted value of the centroid is a positive value, the value is converted to the inputted value or more, and in the case that the inputted value of the centroid is a negative value, the value is converted to the inputted value and below by the function of the curve 381.

Since the correlation detection interpolation method using the fuzzy inference synthetically determines the accuracy information of each interpolation line, there is a tendency that the centroid approaches the central direction as a whole. Therefore, in the case of a low spatial frequency, the pattern illustrated in FIG. 24 does not arise, and the selection of the interpolation direction by a total determination of the fuzzy inference is not liable to be mistaken. Consequently, the situation in the prior art description as to FIG. 24 does not arise. Therefore, in order to correct the tendency that the centroid approaches the central direction, it is preferable that the centroid is converted by the function shown by the curve 381 in FIG. 10A and selection of the interpolation direction close to the horizontal line is made easy.

The interpolation direction decision circuit comprising the centroid conversion circuit 139 for converting the centroid by the function represented by the curve 381 in FIG. 10A is used for the second interpolation direction decision circuit 2 in FIG. 3.

Incidentally, a circuit wherein the content of the look-up table of the centroid conversion circuit is the characteristic shown in FIG. 9A (which is similar to non-conversion of centroid) is usable for the second interpolation direction decision circuit 2.

Subsequently, the case that the conversion of centroid is performed by the method shown in FIG. 10B is described hereafter. The function shown by the curve 383 in FIG. 10B has a characteristic to shift the centroid to the direction so that the interpolation direction becomes close to the vertical. Therefore, in the case that the inputted value of the centroid is a positive value, the inputted value of the centroid is converted to a value of the inputted value and below, and in the case that the inputted value of the centroid is a negative value, the inputted value is converted to a value of the inputted value or more by the function. Therefore, a look-up table having a characteristic as shown in FIG. 9C is adequate to the characteristic of the function as shown in FIG. 10B.

The interpolation direction decision circuit comprising the centroid conversion circuit 139 for converting the centroid by the function shown by the curve 383 in FIG. 10B is usable for the first interpolation direction decision circuit 1 as shown in FIG. 3.

Incidentally, an interpolation direction decision circuit in which the number of interpolation lines to become candidates in the fuzzy inference operation is reduced can be used for the first interpolation direction decision circuit 1. For example, the number of the interpolation lines can be reduced from seven to five (not shown).

Figure 11:
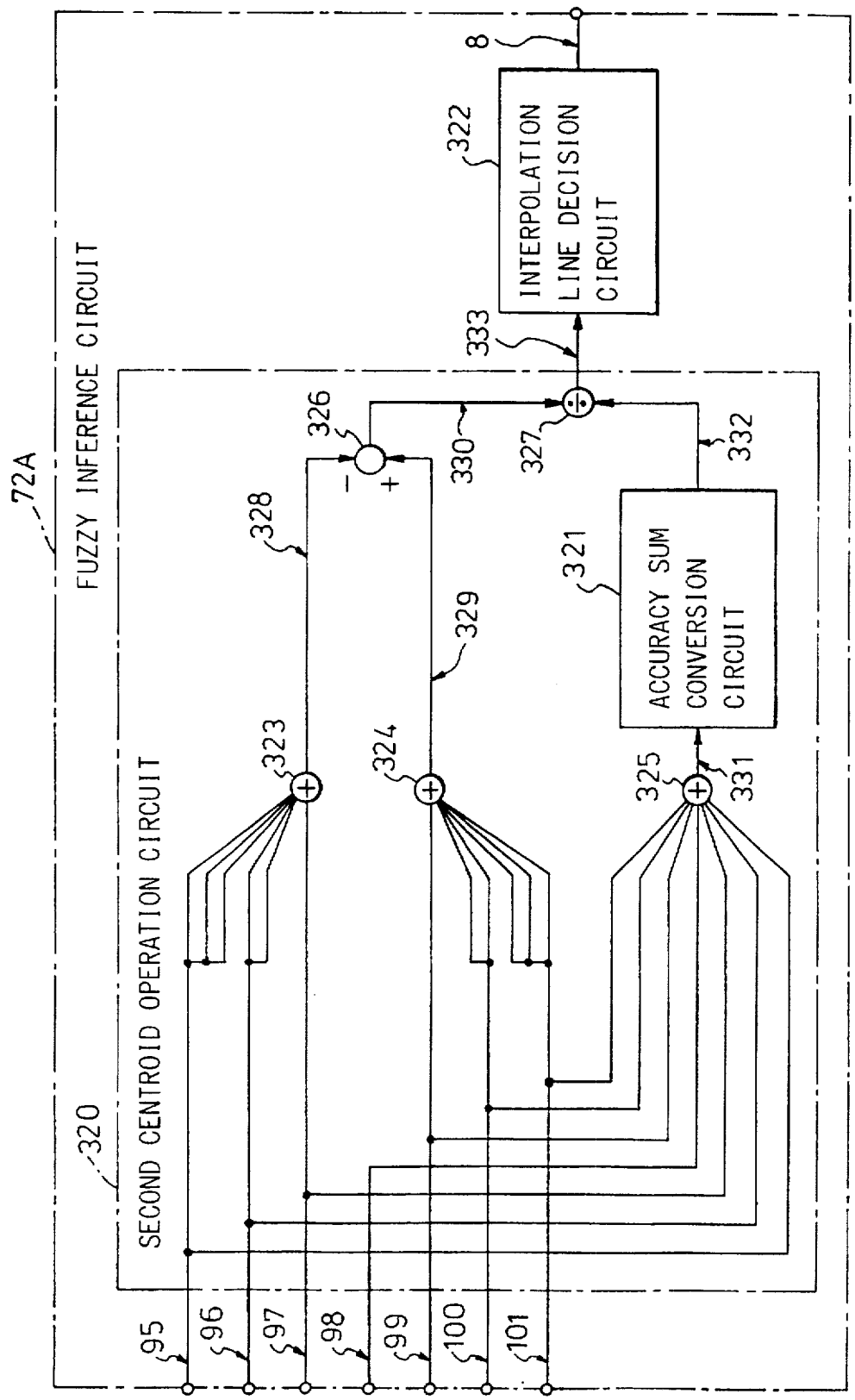
FIG. 11 is a block diagram of another example of the fuzzy inference circuit 72A in FIG. 4.

FIG. 11 is a block diagram of a fuzzy inference circuit of the fuzzy conclusion part in the interpolation direction decision circuit (correlation detection interpolation apparatus) of other example in the embodiment of the present invention. The fuzzy inference circuit 72A shown in FIG. 11 comprises a second centroid operation circuit 320 for deriving the centroid in the interpolation direction and an interpolation line decision circuit 322 for deciding the interpolation line, and the second centroid operation circuit 320 comprises an accuracy sum conversion circuit 321 for converting a sum of accuracy.

The difference of the fuzzy inference circuit 72A of FIG. 11 from the fuzzy inference circuit 72 shown in FIG. 8 is as follows: In the fuzzy inference circuit 72 shown in FIG. 8, the centroid is converted by a predetermined function (a predetermined first function) after centroid operation. On the contrary, in the fuzzy inference circuit 72A shown in FIG. 11, the sum of accuracy which becomes a denominator in the centroid operation is converted by a predetermined function (a predetermined second function) before the centroid operation. Since the accuracy information is used in a numerator in the centroid operation, both the fuzzy inference operations makes different results from each other.

Figure 12:
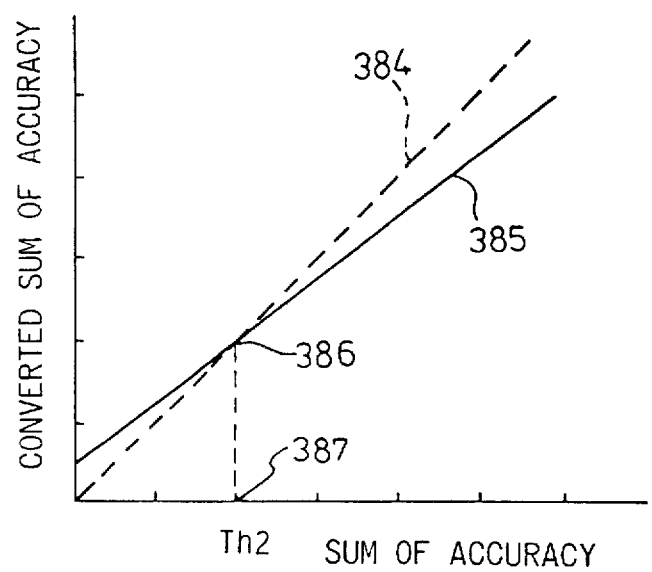
FIG. 12 is a diagram illustrating an accuracy sum conversion function in an accuracy sum conversion circuit in FIG. 11.

FIG. 12 is a diagram representing a line 385 of an accuracy sum conversion function of an example of a conversion function of the sum of accuracy. Referring to FIG. 12, abscissa designates an inputted sum of accuracy, and ordinate designates a sum of accuracy output after conversion. A broken line 384 represents a function that the sum of accuracy is not changed at all. The function for converting the sum of accuracy is represented by the line 385. In this embodiment, the line 385 which is the line 384 rotated clockwise about a point 386 is the accuracy sum conversion function. In general, the following function can be used: when an inputted sum of accuracy is lower than a predetermined second threshold value Th2 indicated by an arrow 387, a sum of accuracy to be output is converted to a value of the inputted sum of accuracy or more, and when the inputted sum of accuracy is the above-mentioned threshold value Th2 or more, the sum of accuracy to be output is converted to a value of the inputted sum of accuracy and below.

In the conversion of the sum of accuracy by the above-mentioned function, in the case that the sum of accuracy is smaller than the above-mentioned second threshold value Th2, the denominator which is the converted sum of accuracy increases, and the centroid approaches the center. Consequently, there is a select tendency to select an interpolation direction close to the vertical. On the contrary, in the case that the sum of accuracy is the second threshold value Th2 or more, the denominator decreases, and there is a tendency that the centroid leaves the center. Consequently, there is a tendency to select an interpolation direction close to the horizontal.

In overall viewing, a small sum of accuracy indicates that reliability is low in all interpolation directions. On the contrary, in the case of a large sum of accuracy (high accuracy), existence of an interpolation direction which is reliable on an order is indicated. Therefore, when the sum of accuracy is small, the interpolation direction close to the vertical is selected. On the contrary, when the sum of accuracy is large, since there is a tendency that the centroid approaches the center by the characteristic of the fuzzy inference as mentioned above, it is preferable that the centroid is converted so as to approach the horizontal interpolation direction by converting the sum of accuracy which becomes the denominator in the centroid operation to a small value. Consequently, an erroneous interpolation is reduced, and a possibility of selecting the interpolation direction close to the horizontal is enhanced.

The interpolation direction decision circuit (correlation detection) comprising the fuzzy inference circuit shown in FIG. 11 is usable for an example of the second interpolation direction decision circuit 2 as shown in FIG. 3.

Incidentally, even if the correlation detection interpolation apparatus comprising only fuzzy inference circuit shown in FIG. 11 is structured without switching operation based on the spatial frequency, a superior interpolation is realizable.

Operation of the fuzzy inference circuit shown in FIG. 11 is described hereafter. The second centroid operation circuit 320 comprises a multi-input adders 323–325, a subtraction circuit 326, a division circuit 327 and the accuracy sum conversion circuit 321. Three parallel accuracy signals 95 output from the antecedent operation circuit 71 (FIG. 4) which are equal to tripling, two parallel accuracy signals 96 which are equal to doubling and an accuracy signal 97 are added in the multi-input adder 323. Moreover, three parallel accuracy signals 101 which are equal to tripling, two parallel accuracy signals 100 which are equal to doubling and an accuracy signal 99 are added in the multi-input adder 324.

A signal 328 output from the multi-input adder 323 is subtracted from a signal 329 output from the multi-input adder 324. Incidentally, since an weight $H_0$ of an accuracy signal 98 is zero times, neither addition nor subtraction is performed.

A sum total 331 of the accuracy signals 95–101 is derived by the multi-input adder 325. The sum of accuracy information 331 is converted by the accuracy sum conversion circuit 321, and becomes a sum of accuracy information 332 after conversion. The accuracy sum conversion circuit 321 can be configured by a look-up table for performing conversion as shown in FIG. 12. In the division circuit 327, the centroid is derived by dividing the output 330 of the subtraction circuit 326 by the sum of accuracy information 332 after conversion output from the accuracy sum conversion circuit 321.

Centroid information 333 output from the second centroid operation circuit 320 is inputted to the interpolation line decision circuit 322. In the interpolation line decision circuit 322, a calculation for adding constant numeral value 3.5 to the inputted value (signal 333) and discarding decimals is carried out to derive the interpolation direction from the centroid information 333. Additionally, operation for rounding up numbers of five and above and rounding down anything under five is simultaneously carried out. The operation is realized by a table storing the characteristic shown in FIG. 9(A). Consequently, sequence of numbers −3, −2, −1, 0, 1, 2 and 3 having positive sign or negative sign are converted to another sequence of numbers "0", "1", "2", "3", "4", "5" and "6" having only positive signs representing seven directions of the interpolation lines. Incidentally, the fuzzy rule, the number of pixels and classification of group of pixels in the fuzzy rule are not limited to the above-mentioned method of the present embodiment.

Figure 13:
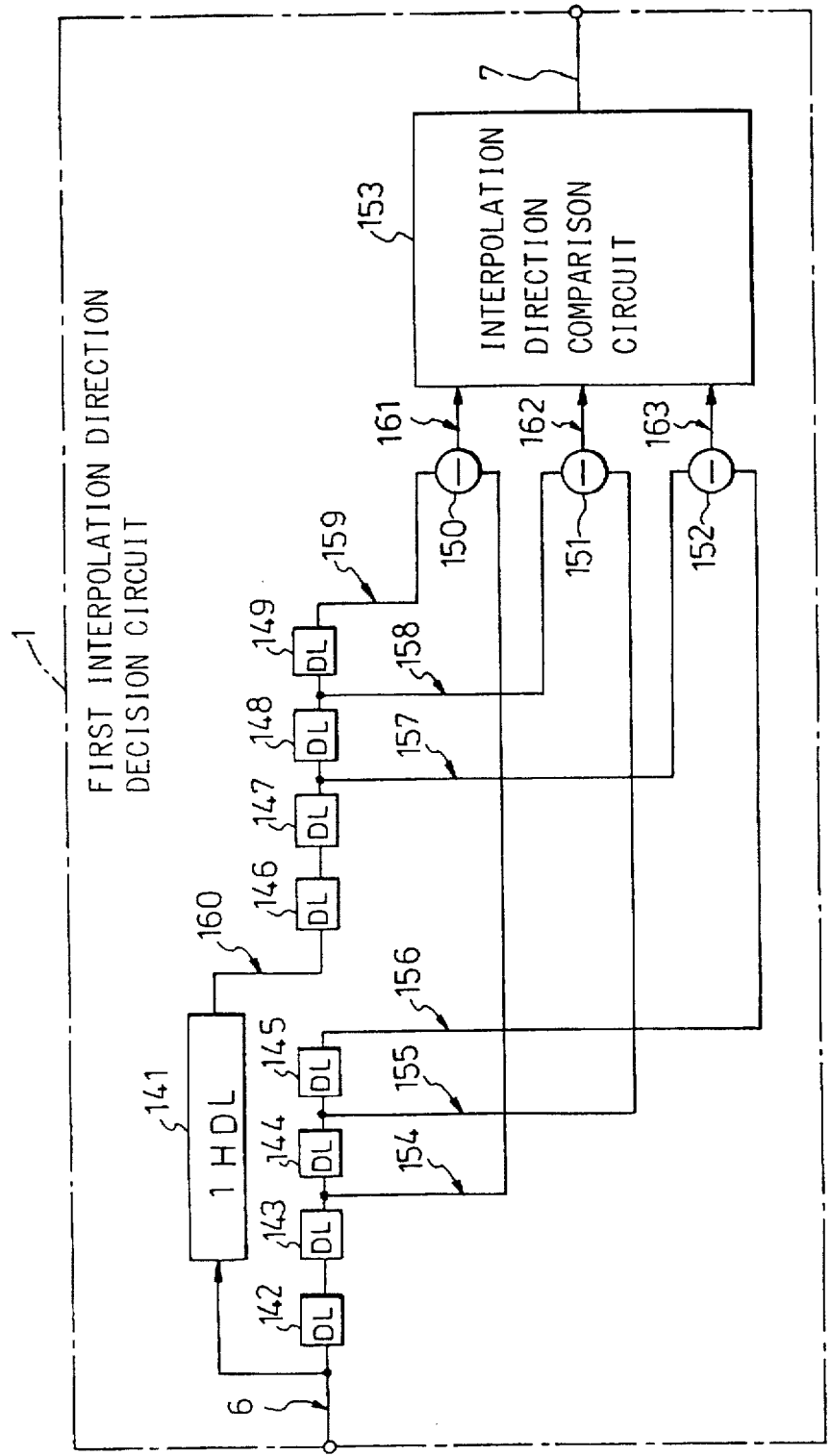

FIG. 13 is a block diagram of other example of the first interpolation direction decision circuit 1 in FIG. 3. The first interpolation direction decision circuit 1 comprises delay circuits 142–149 for delaying by a time period of one pixel, subtraction circuits 150–152 for detecting a correlation value by calculating a level difference of pixels, a vertical delay circuit 141 for delaying by a time period of one scanning line and an interpolation direction comparison circuit 153 for deciding an interpolation direction by comparing correlation in each direction.

Figure 22:
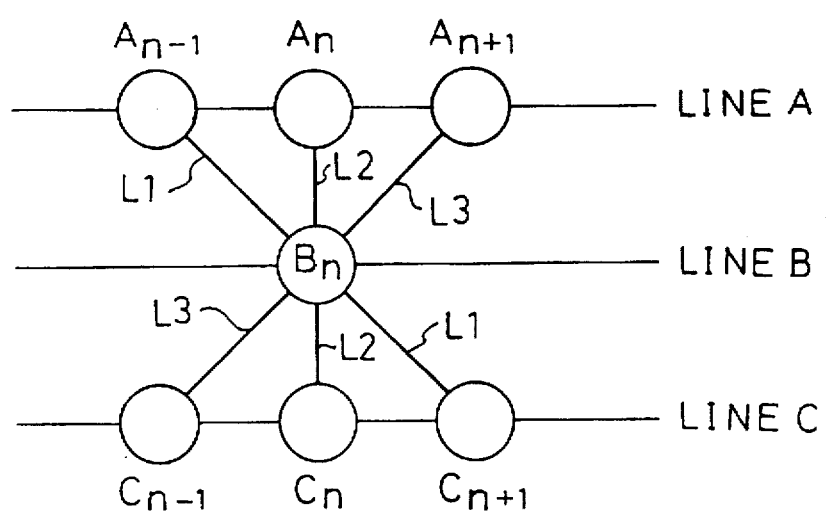
FIG. 22 is the diagram illustrating the interpolation method comprising correlation detection in the prior art.

The video signal 6 inputted from the video input terminal is converted to information of three pixels $C_{n-1}$, $C_n$, $C_{n+1}$ on the line C as shown in FIG. 22 by the horizontal delay circuits 142–145. In a similar manner, the video signal 6 is converted to information of three pixels $A_{n-1}$, $A_n$, $A_{n+1}$ on the line A as shown in FIG. 22 by the vertical delay circuit 141 and the horizontal delay circuits 146–149. Incidentally, the delay circuits 142, 143, 146 and 147 serve to coincide with the delay time of the first interpolation direction decision circuit 1 in FIG. 13 with the delay time of the interpolation direction decision circuit shown in FIG. 4. By the above-mentioned configuration, the delay circuits can be commonly used by both the circuits (In this embodiment, both the circuits are structured by separate circuits).

Level differences in various directions are derived by subtraction operation of the levels of the pixels on the line A and the levels of the pixels on the line C by the subtraction circuits 150–152. Moreover, a level difference 161 in the interpolation direction connecting the pixels $A_{n-1}$, $C_{n+1}$ in FIG. 22 is derived by the subtraction circuit 150. In a similar manner, level differences 162 and 163 in interpolation directions are derived by the subtraction circuits 151 and 152, respectively. An interpolation direction is decided by using the inputted level differences 161–163 in the respective directions by the interpolation direction comparison circuit 153, and the data 7 of the interpolation direction is output.

Figure 14:
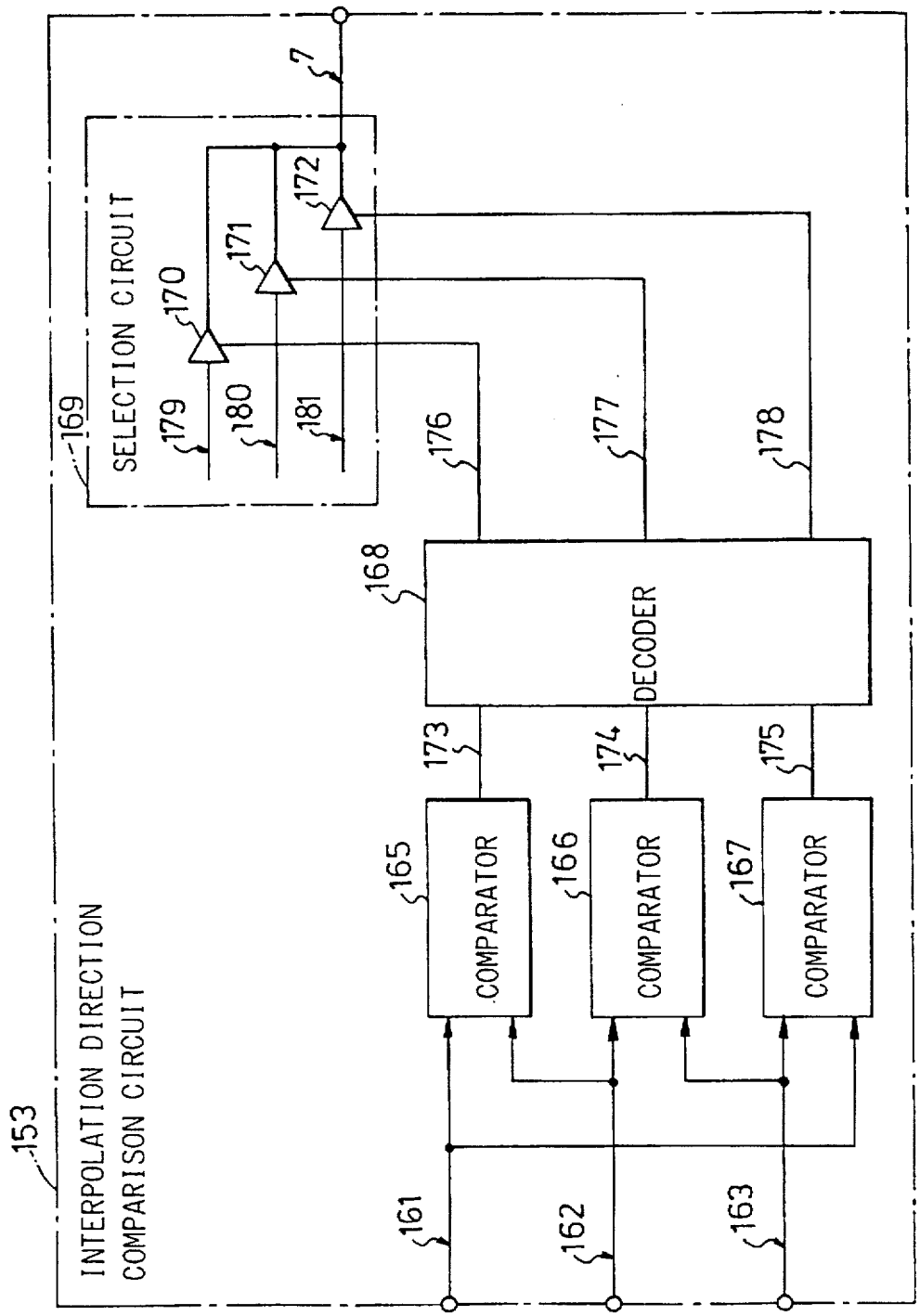
FIG. 14 is a block diagram of an interpolation direction comparison circuit 153 in FIG. 18.

FIG. 14 is a block diagram of the interpolation direction comparison circuit 153 in FIG. 13. The interpolation direction comparison circuit 153 comprises comparators 165–167, a decoder 168 and a selection circuit 169.

The level difference 161 outputs from the subtraction circuit 150 and the level difference 162 output from the subtraction circuit 151 in FIG. 13 are inputted to the comparator 165. The comparator 165 outputs a low level signal to a signal line 173 in the case that the level difference 161 is lower than the level difference 162; and in other cases, a high level signal is output to the signal line 173. In a similar manner, the comparator 166 outputs a low level signal to a signal line 174 in the case that the level difference 162 is lower than the level difference 163; and in other cases, the high level signal is output. Furthermore, the comparator 167 outputs the low level signal to a signal line 175 in the case that the level difference 163 is lower than the level difference 161, and in other cases, the high level signal is output.

In the decoder 168, an interpolation direction is decided from the output signal of the signal lines 173–175 of the comparators 165–167. In the decoder 168, a high level signal is output to a signal line 177 and a low level signal is output to signal lines 176 and 178 when the level difference 162 is one of a minimum level difference. Moreover, in the decoder 168, when the level difference 162 is not the minimum, but the level difference 161 is one of the minimum level difference, a high level signal is output to the signal line 176, and the low level signal is output to the signal lines 177 and 178. Moreover, in the decoder 168, in the case that the level difference 163 is lower than the level differences 161 and 162, the high level signal is output to the signal line 178, and the low level signal is output to the signal lines 176 and 177.

The signals of the signal lines 176–178 are applied to the selection circuit 169. The selection circuit 169 comprises 3-state buffer gates 170–172. Signals of 3 bits are output from the buffer gates 170–172 in a 3-state manner. When the signal line 176 is the high level, the value "2" is output to a signal line 7 from the buffer gate 170, and when the signal line 177 is the high level, the value "3" is output to the signal line 7 from the buffer gate 171. When the signal line 178 is the high level, the value "4" is output to the signal line 7 from the buffer gate 172.

The values "2", "3" and "4" represent the respective interpolation directions, and correspond to the output signal 8 of the interpolation direction decision circuit as shown in FIG. 4 (the same value represents the same interpolation direction). Moreover, a clock signal is synchronized and the delay time is also adjusted (not shown).

Figure 15:
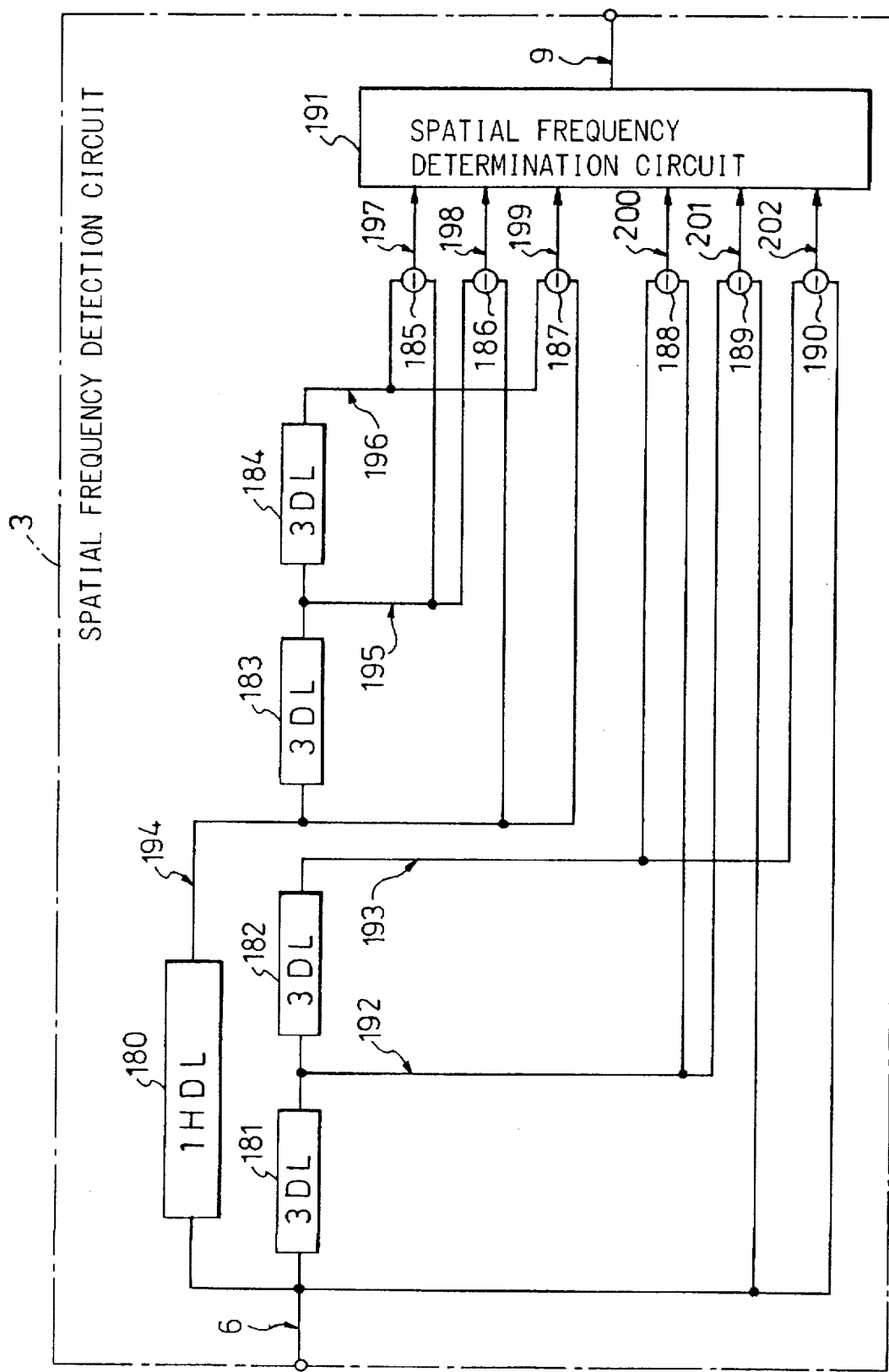
FIG. 15 is a block diagram of a spatial frequency detection circuit 3 in FIG. 3.

FIG. 15 is a block diagram of the spatial frequency detection circuit 3. The spatial frequency detection circuit 3 comprises delay circuits 181–184 for delaying by the time period of three pixels, subtraction circuits 185–190 for calculating the level difference of the pixels, a vertical delay circuit 180 for delaying the time period of one scanning line and a spatial frequency determination circuit 191 for determining a horizontal spatial frequency.

The image signal 6 inputted from the image signal input terminal is delayed by the time period of three pixels by the delay circuit 181, and is further delayed by the time period of three pixels by the delay circuit 182 (time period of 6 pixels in total). Consequently, information of the pixels 40, 43 and 46 (representative values) on the lower scanning line of the attentional pixel 38 in FIG. 2 are attainable. In a similar manner, information (representative values) on the upper scanning line of the attentional pixel are obtainable by the vertical delay circuit 180 and the delay circuits 183 and 184. The center change level and the both ends change levels on each scanning line of the upper and lower scanning lines are derived by using the information of the representative values 6, 192–196. Level differences 197–202 which are needed to derive the center change level, the both ends change level and the spatial frequency information are derived by the subtraction circuits 185–190. The derived level differences 197–202 are inputted to the spatial frequency determination circuit 191, and a horizontal spatial frequency information is detected.

Figure 16:
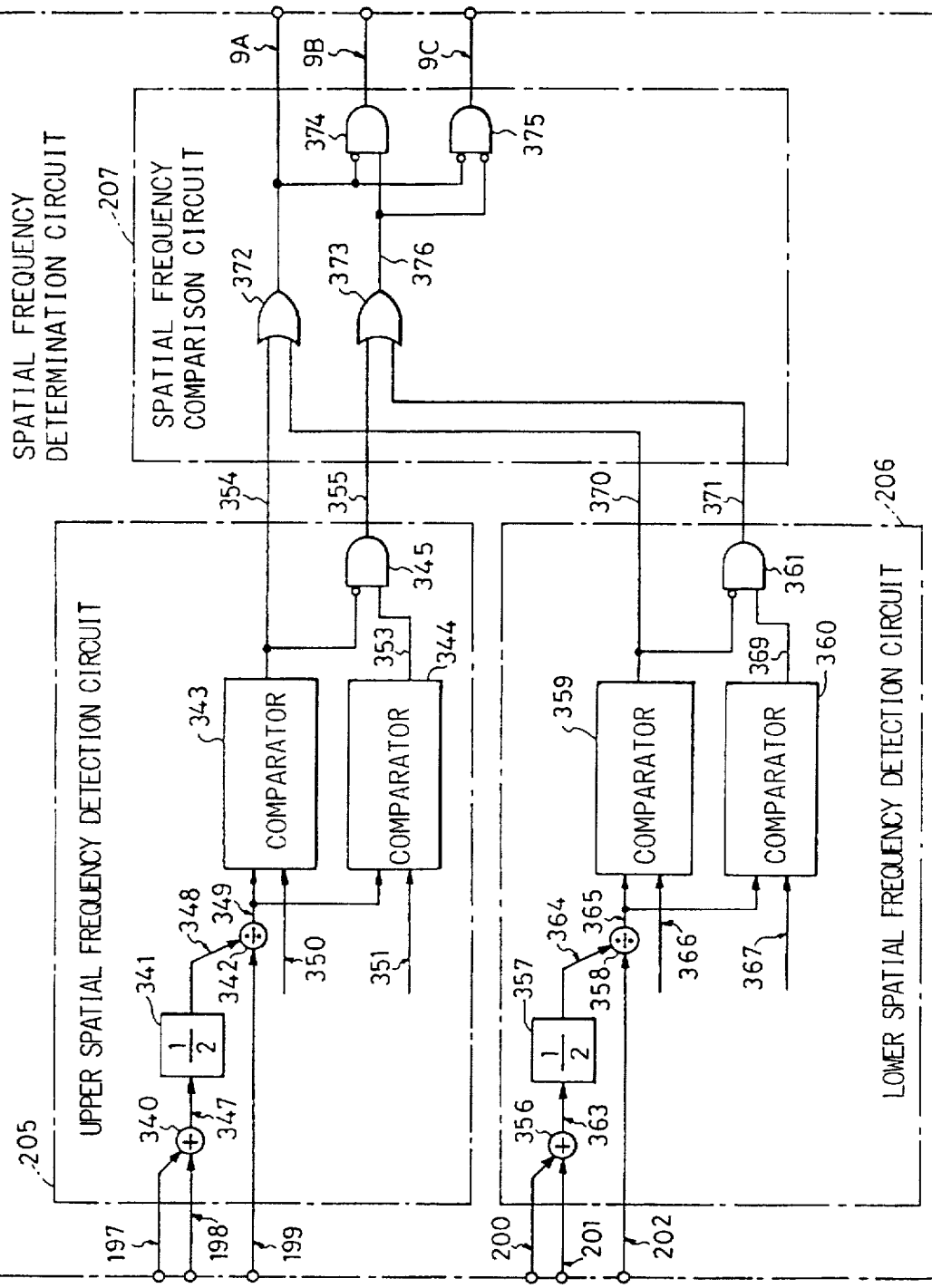
FIG. 16 is a block diagram of a spatial frequency determination circuit 191 in FIG. 15.

FIG. 16 is a block diagram of a spatial frequency determination circuit 191. The spatial frequency determination circuit 191 comprises an upper spatial frequency detection circuit 205 for detecting a spatial frequency on the upper scanning line in the vicinity of the attentional pixel, a lower spatial frequency detection circuit 206 for detecting a spatial frequency on the lower scanning line in the vicinity of the attentional pixel, and a spatial frequency comparison circuit 207. In the spatial frequency comparison circuit 207, the upper spatial frequency information output from the upper spatial frequency detection circuit 205 and transmitted by signal lines 354 and 355 are compared with the lower spatial frequency information output from the lower spatial frequency detection circuit 206 and transmitted by signal lines 370 and 371, and a higher spatial frequency information than the other is output.

In the spatial frequency determination circuit 191 in FIG. 16, the horizontal spatial frequency is classified into three groups of a first group (spatial frequency is high) a second group (spatial frequency is not high nor low) and a third group (spatial frequency is low). First, the description is made as to the upper spatial frequency detection circuit 205.

The upper spatial frequency detection circuit 205 comprises an adder 340, dividing circuits 341 and 342, comparators 343 and 344 and a logic element 345. First in order to derive a center change level 348, the level difference 197 is added to the level difference 198 in the adder 340, and a resultant value is divided by 2 in the division circuit 341 and an average is derived. Subsequently, the center change level 348 is divided by the level difference 199 (both ends change level) in the division circuit 342. A resultant ratio 349 is compared with a threshold value 350 in the comparator 343. A high level signal is output from the comparator 343 to a signal line 354 when the ratio 349 is larger than the threshold value 350. The high level of the signal line 354 indicates that the upper spatial frequency is high (first group). At this time, the logic element 345 outputs a low level signal to a signal line 355.

On the other hand, the ratio 349 is compared with a threshold value 351 in the comparator 344. A high level signal is output from the comparator 344 to a signal line 353 when the ratio 349 is larger than the threshold value 351. The logic element 345 outputs a high level signal to the signal line 355 when the signal line 354 is the low level and the signal line 353 is the high level. The high level of the signal line 355 indicates that the upper spatial frequency is not high nor lower (second group). Moreover, the low level in both the signal lines 354 and 355 indicates that the upper spatial frequency is low.

The lower spatial frequency detection circuit 206 comprises an adder 356, division circuits 357 and 358, comparators 359 and 360 and a logic element 361. First, in order to derive a center change level 364 of the lower scanning line, the level difference 200 is added to the level difference 201 by the adder 356, and a resultant value is divided by 2 and an average is derived. Subsequently, the center change level 364 is divided by the level difference (both ends change level) 202 in the division circuit 358. A resultant ratio 365 is compared with a threshold value 366 by the comparator 359. A high level signal is output from the comparator 359 to a signal line 370 when the ratio 365 is larger than the threshold value 366. The high level of the signal line 370 indicates that the lower spatial frequency is high. At this time, the logic element 361 outputs a low level signal to a signal line 371.

Moreover, the ratio 365 is compared with a threshold value 367 in the comparator 360. A high level signal is output from the comparator 360 to a signal line 369 when the ratio 365 is larger than the threshold value 367. The logic element 361 outputs a high level signal to a signal line 371 when the signal line 370 is the low level and the signal line 369 is the high level. The high level of the signal line 371 indicates that the lower spatial frequency is not high nor low. Moreover, the low level of both signal lines 370 and 371 indicates that the upper spatial frequency is low (third group).

Incidentally, the threshold value 350 is equal to the threshold value 366 and is the value "2", for example. Moreover, the threshold value 351 is equal to the threshold value 367 and is the value "1", for example.

The spatial frequency comparison circuit 207 comprises OR-gates 372 and 373, an AND-gate 376 having one invert set input and one non-invert set input and an AND-gate 375 having two invert set inputs. In the spatial frequency comparison circuit 207, the upper spatial frequency information on the signal lines 354 and 355 are compared with the lower spatial frequency information on the signal lines 370, 371, and spatial frequency information having a higher spatial frequency is output. Therefore, the OR gate 372 outputs a high level signal to a signal line 9A in the case that the signal of at least one of the signal lines 354 and 370 is the high level. The high level of the signal line 9A indicates that at least one of the upper spatial frequency and the lower spatial frequency is a high spatial frequency. When the signal line 9A is the high level, signal lines 9B and 9C become low levels.

When the OR-gate 373 outputs the high level signal to a signal line 376, the signal of at least one of the signal lines 355 and 371 is the high level. When the signal line 9A is the low level and the signal line 376 is the high level, the AND gate 374 outputs the high level signal to the signal line 9B. At this time, the signal line 9C becomes a low level. The high level of the signal line 9B indicates that both the upper spatial frequency and the lower spatial frequency are not a high frequency, and at least one of the upper spatial frequency and the lower spatial frequency has a spatial frequency which is not high nor low. Moreover, the high level of the signal line 9C indicates that both the upper spatial frequency and the lower spatial frequency are low.

By the above-mentioned operation, the spatial frequency is classified into three groups. The information on the signal lines 9A, 9B and 9C become the spatial frequency information 9.

Incidentally, a criterion of high or low in the horizontal spatial frequency is different in dependence upon the input image and an apparatus to be used.

Moreover, in order to simplify the apparatus, either one of the upper spatial frequency detection circuit and the lower spatial frequency detection circuit can be comprised in the spatial frequency determination circuit.

In the spatial frequency determination circuit 191 as shown in FIG. 16, the horizontal spatial frequency is liable to be erroneously determined, because the representative values are derived on the basis of the pixels of the center and both ends. In order to reduce the erroneous determination, a selection method of the representative values can be changed in accordance with an input image (movie or LD). For example, there is a method that the representative values are derived on the basis of average levels or median values of the groups of the pixels. Moreover, a spatial frequency determination circuit using plural representative values can be configurated. In the embodiment, though the horizontal spatial frequency is classified into three groups in the spatial frequency determination circuit 191, the classification is not limited to three groups. Furthermore, a band-pass filter or the like can be used for detecting the horizontal spatial frequency for the spatial frequency detection circuit 3.

Figure 17:
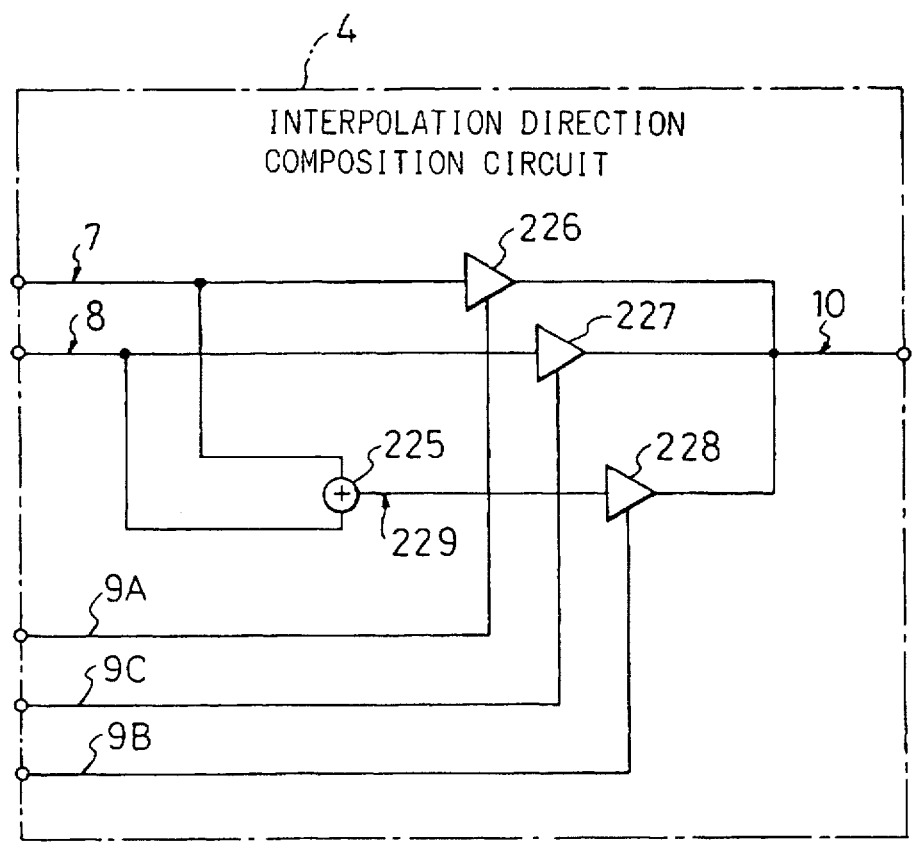
FIG. 17 is a block diagram of an interpolation direction composition circuit 4 in FIG. 3.

FIG. 17 is a block diagram of the interpolation direction composition circuit 4 in FIG. 3. The interpolation direction composition circuit 4 comprises an operation circuit 225 for deriving an average and 3-state buffer gates 226–228. The interpolation direction signal 7 derived by the first interpolation direction decision circuit 1 and the interpolation direction signal 8 derived by the second interpolation direction decision circuit 2 are inputted to the operation circuit 225 and an average is calculated.

In the present embodiment, the data 7 of the interpolation direction signal 7 have one value of the values "0", "1", "2", "3", "4", "5" and "6" as mentioned above. Therefore, in the case that the data of the interpolation direction signal 7 is the value "0" and the data of the interpolation direction signal 8 is the value "2", for example, the interpolation direction signal 229 output from the operation circuit 225 becomes the value "1". Incidentally, in the operation circuit 225, number below the decimal point is round up numbers of five and above and rounds down anything under five. One of the interpolation direction signals 7, 8 and 229 is selected by the buffer gates 226–228, and is output as the interpolation direction composition signal 10.

In the case that the output signal of the signal line 9A of the spatial frequency detection circuit 3 is the high level (the spatial frequency is high), the interpolation direction signal 7 output from the first interpolation direction decision circuit 1 is selected. Moreover, in the case that the output signal of the signal line 9C is the high level (the horizontal spatial frequency is low), the interpolation direction signal 8 output from the second interpolation direction decision circuit 2 is selected. In the case that the output signal of the signal line 9B is the high level (the horizontal spatial frequency is not high nor low), the interpolation direction signal 229 output from the operation circuit 225 is selected. A selected signal becomes the interpolation direction composition signal 10.

Figure 18:
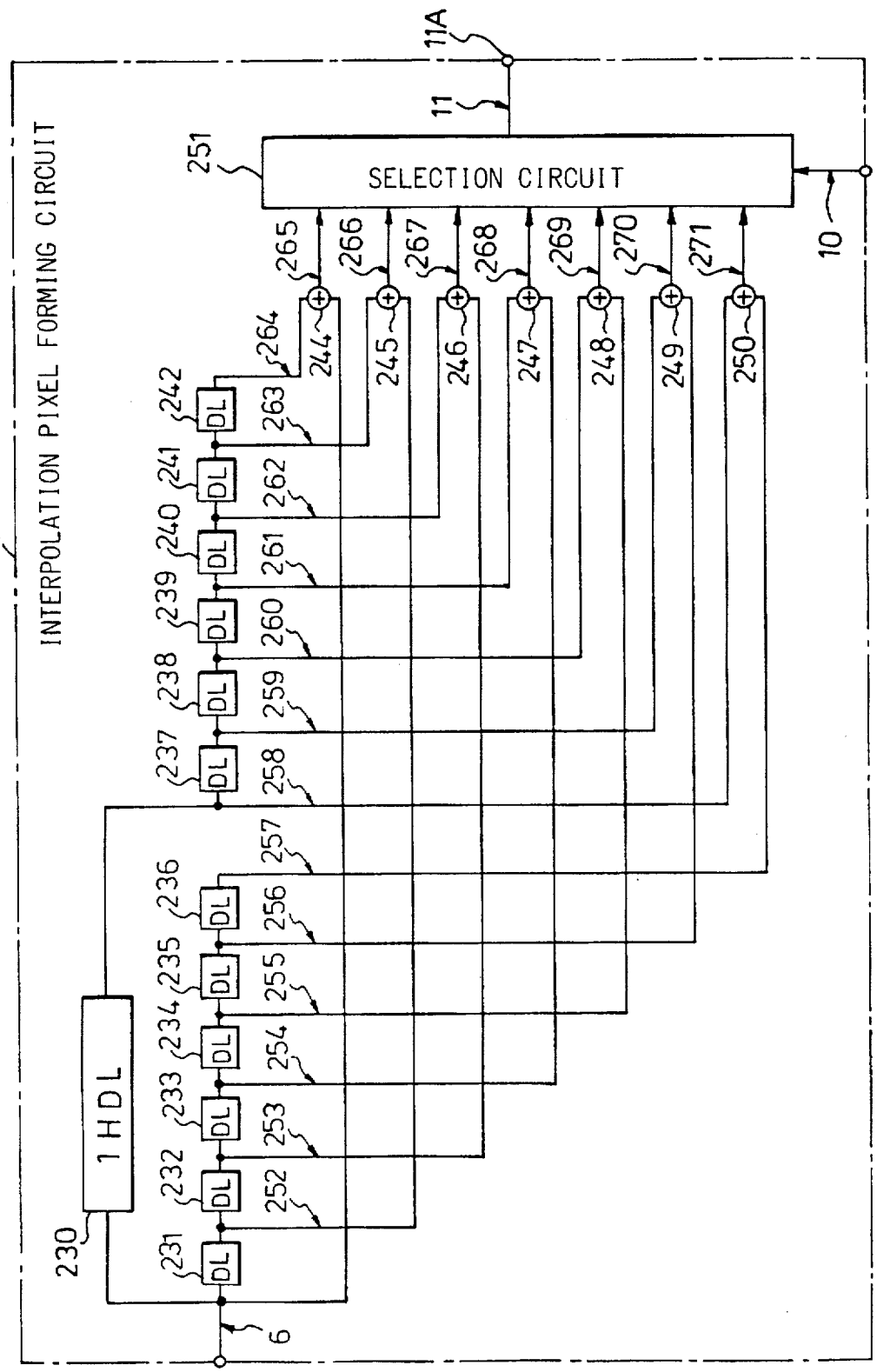
FIG. 18 is a block diagram of a first interpolation direction decision circuit 1 in FIG. 8.

FIG. 18 is a block diagram of the interpolation pixel forming circuit 5 in FIG. 3. The interpolation pixel forming circuit 5 comprises delay circuits 231–242 for delaying a time period of one pixel, operation circuits 244–250 for deriving an average luminance level of pixels, a vertical delay circuit 230 for delaying a time period of one scanning line and a selection circuit 251.

Figure 24:
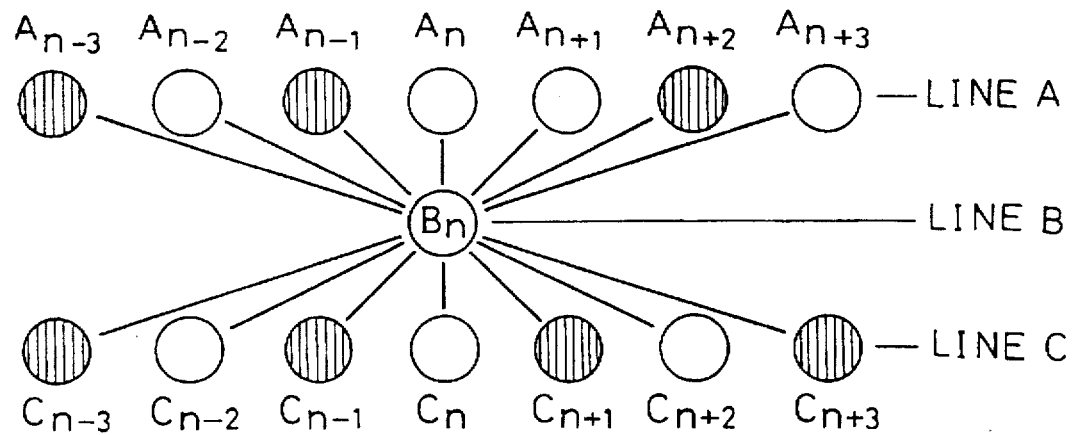
FIG. 24 is the diagram illustrating an example of the image having high horizontal spatial frequency.

The operation circuits 244–250 derive an arithmetic mean of the luminance levels of the pixels on the line A and the pixels on the line C shown in FIG. 24. The operation circuit 244 derives an interpolation value 265 in the interpolation direction connecting the pixels $A_{n-3}$ and $C_{n+3}$ in FIG. 24. The operation circuit 245 derives an interpolation value 266 in the interpolation direction connecting the pixels $A_{n-2}$ and $C_{n+2}$. In a similar manner, the operation circuits 246–250 derive interpolation values 267–271 in the interpolation directions connecting the pixels of each pair of pixels ($A_{n-1}$ and $C_{n+1}$), pixels ($A_n$, $C_n$), pixels ($A_{n+1}$, $C_{n-1}$), pixels ($A_{n+2}$, $C_{n-2}$) and pixels ($A_{n+3}$, $C_{n-2}$), respectively.

The selection circuit 251 selects one of the seven interpolation values 265–271 by using an interpolation direction composition signal 10 output from the interpolation direction composition circuit 4 in FIG. 3, and outputs to a video output terminal 11A.

Figure 19:
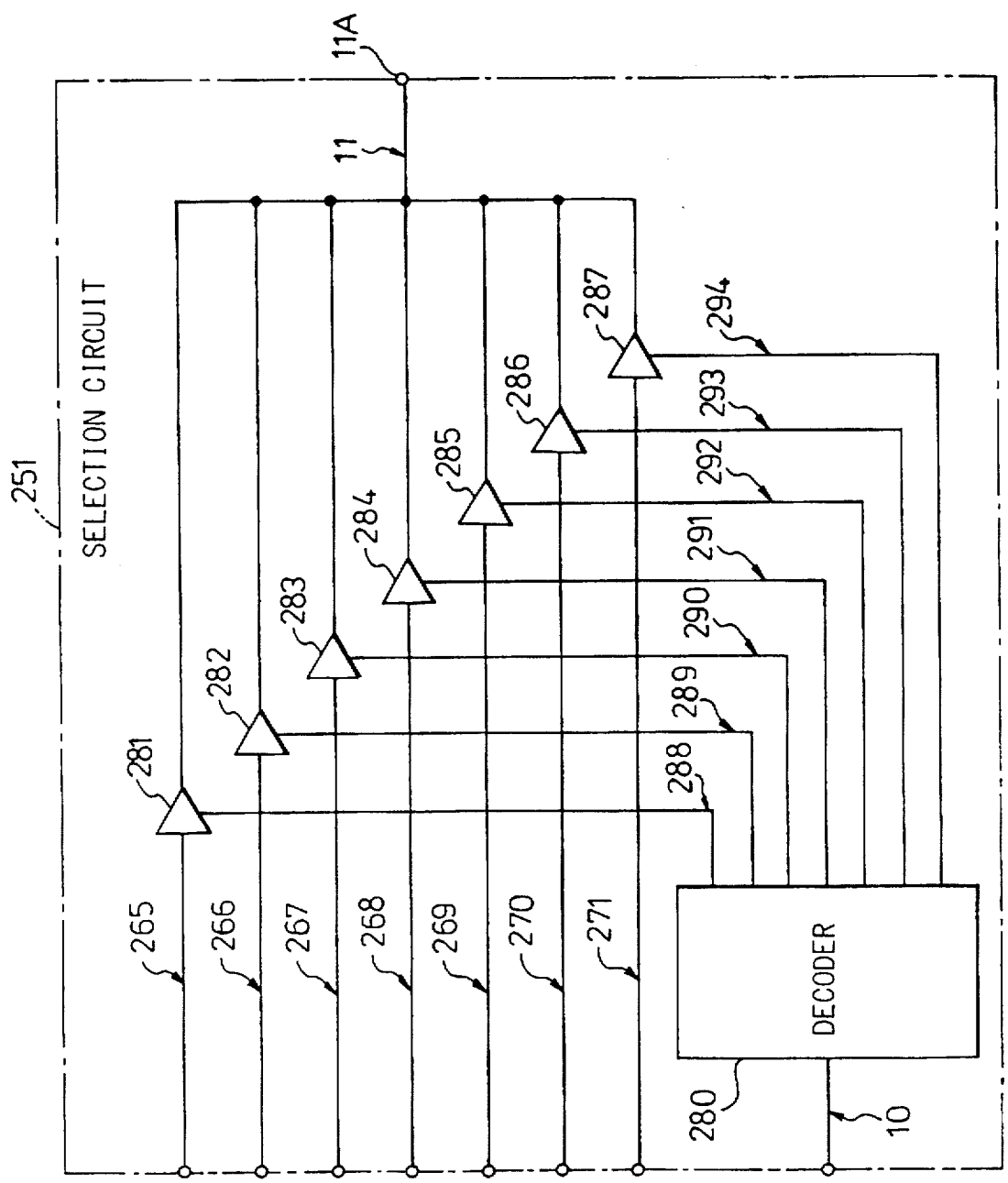
FIG. 19 is a block diagram of a selection circuit in FIG. 18.

FIG. 19 is a block diagram of the selection circuit 251 in FIG. 18. The selection circuit 251 in FIG. 19 comprises a decoder 280 and 3-state buffer gates 281–287. The interpolation direction composition signal 10 output from the interpolation direction composition circuit 4 in FIG. 3 is inputted to the decoder 280, and selection signals 288–294 for selecting one of the interpolation values 265–271 in the respective interpolation directions are output. In the 3-state buffer gates 281–287, when one of the selection signals 288–294 becomes a high level, a corresponding buffer gate becomes an active state, and the interpolation value of a selected interpolation line is output to the image output terminal 11A as an interpolation pixel signal 11. Incidentally, the output lines of the buffer gates 281–287 are structured to a wired-OR-circuit.

In the embodiment, only two interpolation direction decision circuits are shown as the first interpolation direction decision circuit 1 and the second interpolation direction decision circuit 2, but the number of interpolation direction decision circuits is not limited to two. A plurality of the interpolation direction decision circuits can be used. Moreover, the interpolation direction decision circuit is not limited to the method in the second embodiment.

Moreover, overlapped parts of the circuits such as delay circuits shown in FIG. 4, FIG. 13, FIG. 15 and FIG. 18 can be put together. For example, the vertical delay circuits 62, 141, 180 and 230 for delaying the time period of one scanning line can be structured by the same circuits in the apparatus.

[Third Embodiment]

Figure 20:
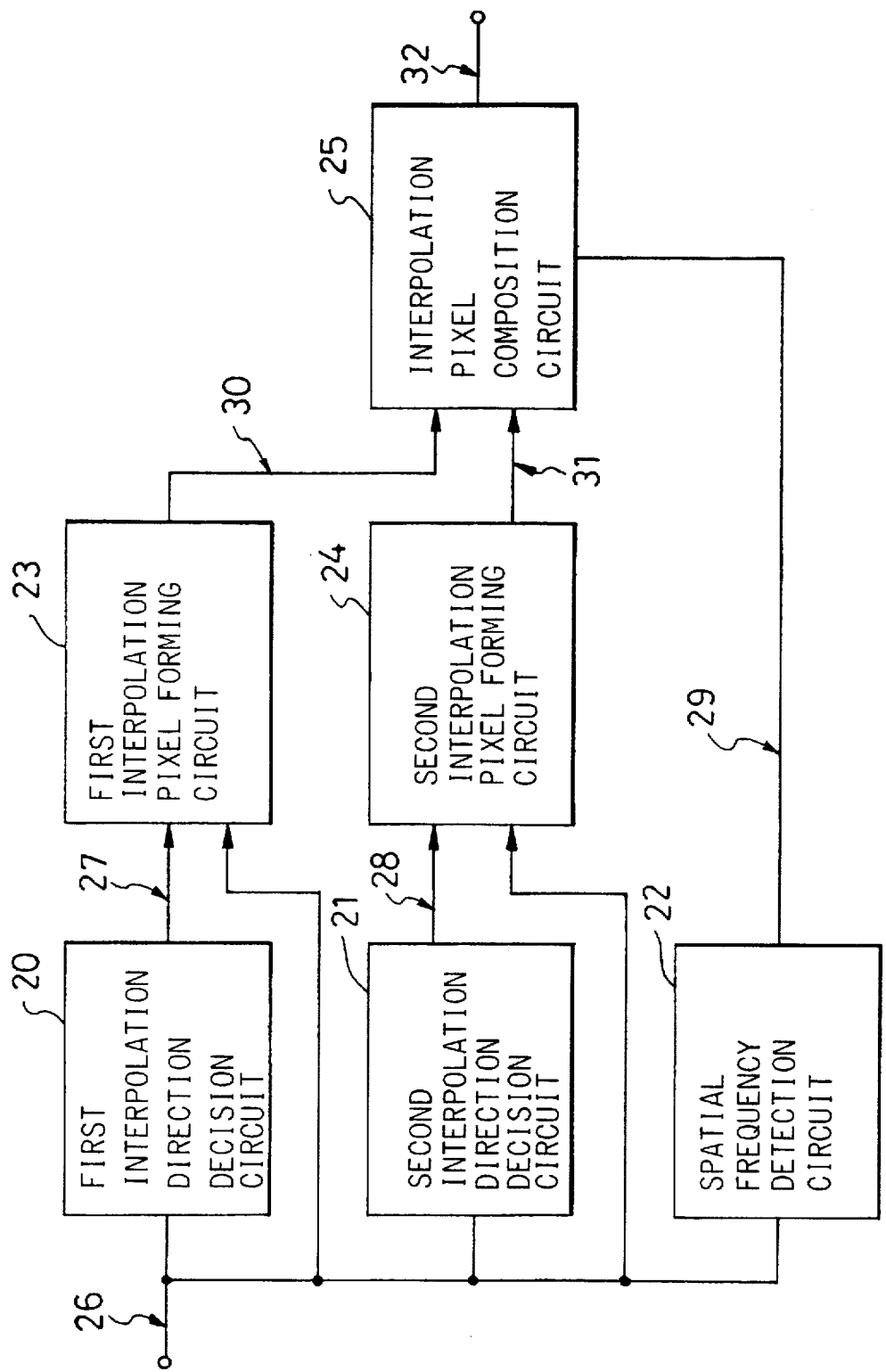
FIG. 20 is a block diagram of another embodiment of the spatial frequency adaptive field-interpolation apparatus of a third embodiment the present invention.

FIG. 20 is a block diagram of the spatial frequency adaptive field-interpolation apparatus of the third embodiment of the present invention. The spatial frequency adaptive field-interpolation apparatus as shown in FIG. 20 comprises a first interpolation direction decision circuit 20, a second interpolation direction decision circuit 21, a spatial frequency detection circuit 22, a first interpolation pixel forming circuit 23, a second interpolation pixel forming circuit 24 and an interpolation pixel composition circuit 25.

First, the video signal 26 is inputted to the first interpolation direction decision circuit 20, and a first interpolation direction is decided. Simultaneously, the image signal 26 is inputted to the second interpolation direction decision circuit 21, and a second interpolation direction is decided. A first interpolation pixel signal 30 is formed from the image signal 26 on the basis of the first interpolation direction signal 27 output from the first interpolation direction decision circuit 20 by the first interpolation pixel forming circuit 23. In a similar manner, a second interpolation pixel signal 31 is formed from the image signal 26 by using the second interpolation direction signal 28 output from the second interpolation direction decision circuit 21 by the second interpolation pixel forming circuit 24.

Moreover, a horizontal spatial frequency in the vicinity of the attentional pixel is detected by the spatial frequency detection circuit 22, and a spatial frequency information 29 is output. The first interpolation pixel signal 30 and the second interpolation pixel signal 31 are composed by using the spatial frequency information 29 in the interpolation pixel composition circuit 25. Incidentally, instead of composition of the First interpolation pixel signal 80 and the second interpolation pixel signal 81 in the interpolation pixel composition circuit 25, a configuration selecting one of the First interpolation pixel signal 80 and the second interpolation pixel signal 31 is applicable.

The first interpolation direction decision circuit 20 in FIG. 20 is realizable by the same configuration as the first interpolation direction decision circuit as shown in the FIG. 13. Moreover, the second interpolation direction decision circuit 21 is realizable by the same configuration as the interpolation direction decision circuit as shown in FIG. 4 (for example, what comprising the fuzzy inference circuit as shown in FIG. 11). Moreover, the spatial frequency detection circuit 22 is realizable by the same configuration as the spatial Frequency detection circuit as shown in FIG. 15.

Moreover, the first interpolation pixel forming circuit 23 and the second interpolation pixel forming circuit 24 are realizable by the same configuration as the interpolation pixel forming circuit as shown in FIG. 15.

Figure 21:
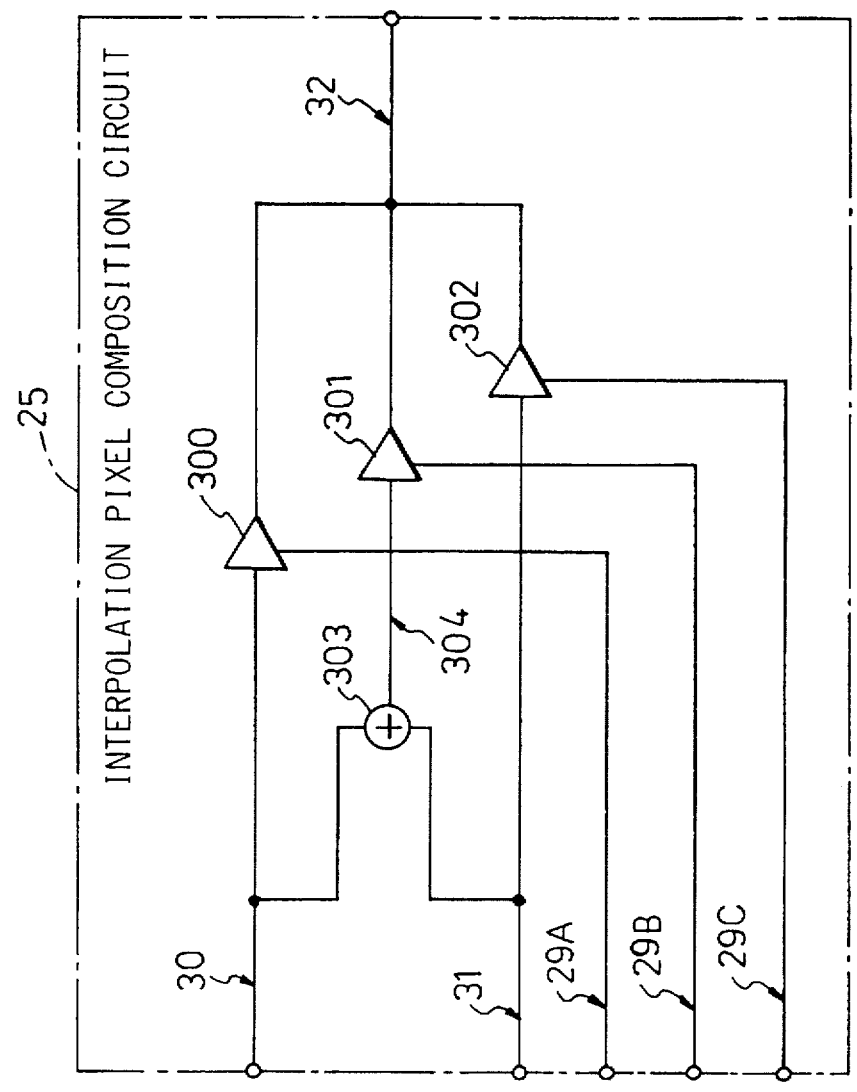
FIG. 21 is a block diagram of an interpolation pixel composition circuit 25 in FIG. 20.

FIG. 21 is a block diagram of the interpolation pixel composition circuit 25. The interpolation pixel composition circuit 25 comprises an operation circuit 303 for deriving an average and 3-state buffer gates 300–302.

The first interpolation pixel signal 30 formed by the first interpolation pixel forming circuit 23 and the second interpolation pixel signal 31 formed by the second interpolation pixel forming circuit 24 are applied to the operation circuit 303 and an average is derived. One of the first interpolation pixel signal 30, the second interpolation pixel signal 31 and the interpolation pixel signal 304 output from the operation circuit 303 is selected by the buffer gates 300–302 and is output as an interpolation pixel signal 32.

In this embodiment, in the case that the output signal 29A of the spatial frequency detection circuit 22 is a high level (the horizontal spatial frequency is high), the interpolation pixel signal 30 output from the first interpolation pixel forming circuit 23 is selected. Moreover, in the case that the output signal 29C of output from the spatial frequency detection circuit 22 is a high level (the horizontal spatial frequency is low), the interpolation pixel signal 31 output from the second interpolation pixel forming circuit 24 is selected, and in the case that the output signal 9B is a high level (the horizontal spatial frequency is not high nor low), the interpolation pixel signal 304 output from the operation circuit 303 is selected.

By the above-mentioned configuration, composition or selection of the interpolation pixel is realizable.

The third embodiment differs from the second embodiment in the spatial frequency adaptive field-interpolation apparatus. In the second embodiment, the interpolation pixel signal 11 which is formed by the spatial frequency adaptive field-interpolation apparatus is the average luminance value of the upper and lower pixels on the interpolation line passing through the pixel to be interpolated. On the contrary, in the third embodiment, the interpolation pixel signal 32 which is formed by the spatial frequency adaptive field-interpolation apparatus is not always the average luminance value of the upper and lower pixels on the interpolation line passing through the pixel to be interpolated. Namely, the third embodiment is different from the second embodiment in the point that an interpolation pixel which is not equal to the average value of the upper and lower pixels on any interpolation line is possible to be formed by deriving an average by the operation circuit 303.

Though three interpolation pixel signals are selected in the third embodiment (interpolation pixel signals 30, 31 and 304), the number of the interpolation pixel signals is not limited to three. Furthermore, the operation circuit 303 can be configurated so that the average is not derived but the value is varied continuously by the weight of the horizontal spatial frequency.

Moreover, though two interpolation direction decision circuits and two interpolation pixel forming circuits are used in this embodiment, the respective numbers of these circuits are not limited to two.

Moreover, the descriptions in all embodiments are made by taking example of monochrome information, but these embodiments are applicable to color information. In the color information, it is not preferable that the interpolation operation is separately applied to signals of R, G and B of the color information. It is preferable that correlation is detected by using a luminance signal or the G-signal, and the interpolation operation is applied to the R-signal, G-signal and B-signal in the same interpolation direction.

Moreover, the delay circuits can be configurated by synchronizing circuits synchronizing with a predetermined clock signal by using latchs or flip-flops or the like.

Moreover, though these embodiments are described on the basis of hardware configurations, the apparatus is realizable by a soft-ware routine. Such apparatus further comprises a CPU (or DSP) for operating orders, a ROM for storing the orders or a table for the CPU, a work area of which the CPU performs the order, a RAM for line buffers of three scanning lines of which the CPU uses for the interpolation in the present invention and an I-O port for inputting a field video signal and for outputting a frame video signal interpolated by the CPU.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A spatial frequency adaptive field-interpolation method for setting interpolation lines in plural directions passing through an attentional pixel to be interpolated on a scanning line, plural pixels on an upper scanning line placed on one side of said scanning line and plural pixels on a lower scanning line placed on the other side of said scanning line in one field, and interpolating scanning lines of a video signal by interpolating said attentional pixel by the respective pixels belonging to said upper scanning line and said lower scanning line on an interpolation line in a direction of said plural directions, said method comprising the steps of:

(a) detecting a horizontal spatial frequency in the vicinity of said attentional pixel from image data of one field, (b) selecting one interpolation line in said plural interpolation lines by performing plural steps for interpolation direction decision, (c) selecting one of said plural interpolation direction decision steps on the basis of the spatial frequency obtained from said image data of one field by said detecting step (a), and (d) forming said attentional pixel by using pixels of said upper scanning line and lower scanning line on an interpolation line obtained by said interpolation direction decision steps selected in step (c).

2. A spatial frequency adaptive field-interpolation method in accordance with claim 1, wherein in at least one of pixel groups of a pixel group on said upper scanning line and a pixel group of said lower scanning line in the vicinity of said attentional pixel in one field, said pixel groups are divided into a central pixel group in the vicinity of said attentional pixel, a left pixel group placed leftward of said central pixel group and a right pixel group placed rightward of said central pixel group, and said detecting step (a) further comprises the steps of:

(i) deriving a first level difference between a first representative value of said central pixel group and a second representative value of said left pixel group, (ii) deriving a second level difference between said first representative value and a third representative value of said right pixel group, (iii) deriving an average level difference of said first level difference and said second level difference, (iv) deriving a third level difference between said second representative value and said third representative value, and (v) forming spatial frequency information by comparing said average level difference with said third level difference.

3. A spatial frequency adaptive field-interpolation method in accordance with claim 2, wherein said spatial frequency information forming step comprises deriving a ratio of said average level difference to said third level difference, forming spatial frequency information for selecting a first interpolation direction decision step having a high discrimination accuracy of an interpolation direction with respect to a first area in a substantially vertical direction passing through the center of said attentional pixel when said ratio is larger than a predetermined first threshold value, and forming spatial frequency information for selecting a second interpolation direction decision step having a high discrimination accuracy with respect to a second area in a substantially horizontal direction passing through the center of said attentional pixel when said ratio is equal to said predetermined first threshold value and below.

4. A spatial frequency adaptive field-interpolation apparatus for setting interpolation lines in plural directions passing through an attentional pixel to be interpolated on a scanning line, plural pixels on an upper scanning line placed on one side of said scanning line and plural pixels on a lower scanning line placed on the other side of said scanning line in one field, interpolating pixels of a video signal by interpolating in a direction, said apparatus comprising:

plural means of interpolation direction decision for deriving an interpolation line to be interpolated from said plural interpolation lines, spatial frequency detection means for detecting a horizontal spatial frequency in the vicinity of said attentional pixel from image data of one field, interpolation direction composition means for composing plural interpolation direction signals output from said plural interpolation direction decision means on the basis of the spatial frequency information output from said spatial frequency detection means, and outputting an interpolation direction composition signal, and interpolation pixel forming means for forming said attentional pixel to be interpolated from an inputted image signal by the interpolation direction composition signal output from said interpolation direction composition means.

5. A spatial frequency adaptive field-interpolation apparatus in accordance with claim 4, wherein said interpolation direction composition means comprises means for selecting one of plural interpolation direction signals output from said plural interpolation direction decision means by a spatial frequency information output from said spatial frequency detection means.

6. A spatial frequency adaptive field-interpolation apparatus for setting interpolation lines in plural directions passing through an attentional pixel to be interpolated on a scanning line, plural pixels on an upper scanning line placed on one side of said scanning line and plural pixels on a lower scanning line placed on the other side of said scanning line in one field, interpolating scanning line of a video signal by interpolating said attentional pixel by pixels belonging to said upper scanning line and lower scanning line on an interpolation line of a direction of said plural directions, said apparatus comprising:

plural means of interpolation direction decision for deriving an interpolation line to be interpolated from said plural interpolation lines, plural interpolation pixel forming means for forming an interpolation pixel signal by respective interpolation direction signals output from said plural interpolation direction decision means, spatial frequency detection means for detecting a horizontal spatial frequency in the vicinity of said attentional pixel in one field, and interpolation pixel composition means for composing said plural interpolation pixel signals output from said plural interpolation pixel forming means on the basis of a spatial frequency information output from said spatial frequency detection means.

7. A spatial frequency adaptive field-interpolation apparatus in accordance with claim 6, wherein said interpolation pixel composition means comprises means for selecting one of said plural interpolation pixel signals output from said plural interpolation pixel forming means on the basis of the spatial frequency information output from said spatial frequency detection means.

8. A spatial frequency adaptive field-interpolation apparatus in accordance with claim 4, wherein said plural interpolation direction decision means comprise first interpolation direction decision means having a high discrimination accuracy of a first area in a substantially vertical direction passing through the center of said attentional pixel, and second interpolation direction decision means having a high discrimination accuracy of a second area in a substantially horizontal direction passing through the center of said attentional pixel.

9. A spatial frequency adaptive field-interpolation apparatus in accordance with claim 8, wherein the number of interpolation lines which become candidates in the case that the attentional pixel in said first interpolation direction decision means is formed is smaller than the number of interpolation lines which become candidates in the case that the attentional pixel in said second interpolation direction decision means is formed.

10. A spatial frequency adaptive field-interpolation apparatus in accordance with claim 4, wherein at least one of said interpolation direction decision means comprises:

operation means for setting interpolation lines in five or more directions and operating a level difference of two pixels on an interpolation line every interpolation line, a fuzzy antecedent part for determining correlation of said every interpolation line from the level difference obtained by said operation means, a fuzzy conclusion part for deciding a direction to be interpolated from said interpolation lines on the basis of said determination of correlation by said fuzzy antecedent part, and said fuzzy conclusion part comprises first centroid operation means for deriving a direction to be interpolated, and centroid conversion means for converting a centroid of the interpolation direction obtained by said first centroid operation means by a predetermined first function.

11. A spatial frequency adaptive field-interpolation apparatus in accordance with claim 10, wherein in the case of application to a low spatial frequency, said predetermined first function which is used in said centroid conversion means is a function having a characteristic to shift to an interpolation direction further close to the horizontal in the case that the centroid of the interpolation direction is an interpolation direction close to the horizontal.

12. A spatial frequency adaptive field-interpolation apparatus in accordance with claim 10, wherein in the case of application to a high spatial frequency, said predetermined first function which is used in said centroid conversion means is a function having a characteristic to shift the centroid of the interpolation direction to an interpolation direction close to the vertical.

13. A spatial frequency adaptive field-interpolation apparatus in accordance with claim 4, wherein one of said interpolation direction decision means comprises operation means for setting interpolation lines in five or more directions and for operating a level difference of two pixels on said interpolation line, a fuzzy antecedent part for determining correlation every interpolation line from the level difference obtained by said operation means, a fuzzy conclusion part for deciding a direction to be interpolated from said interpolation lines on the basis of the determination of correlation by said fuzzy antecedent part, and said fuzzy conclusion part comprises second centroid operation means for deriving said direction to be interpolated, and accuracy sum conversion means for converting sum of accuracy of correlation every said interpolation line which becomes a denominator of centroid operation performed in said second centroid operation means by a predetermined second function.

14. A spatial frequency adaptive field-interpolation apparatus in accordance with claim 13, wherein said predetermined second function which is used in said accuracy sum conversion means is a function of which said sum of accuracy is converted to a value of said sum of accuracy or more in the case that said sum of accuracy is smaller than a predetermined second threshold value and convert said sum of accuracy to a value of said sum of accuracy and below in the case that said sum of accuracy is said predetermined second threshold value or more.

15. A spatial frequency adaptive field-interpolation apparatus in accordance with claim 4, wherein said spatial frequency detection means comprises at least one of upper spatial frequency detection means for detecting a horizontal spatial frequency by using a pixel group on said upper scanning line in the vicinity of said attentional pixel and lower spatial frequency detection means for detecting a horizontal spatial frequency by using a pixel group on said lower scanning line in the vicinity of said attentional pixel, and spatial frequency information to be inputted to said interpolation direction composition means or said interpolation pixel composition means is formed.

16. A spatial frequency adaptive field-interpolation apparatus in accordance with claim 4, wherein said spatial frequency detection means comprises:

an upper spatial frequency detection means for detecting a horizontal spatial frequency by using a pixel group on the upper scanning line in the vicinity of said attentional pixel in one field, lower spatial frequency detection means for detecting a horizontal spatial frequency by using a pixel group on the lower scanning line in the vicinity of said attentional pixel in said one field, and spatial frequency comparison means for outputting a higher spatial frequency information by comparing upper spatial frequency information output from said upper spatial frequency detection means with lower spatial frequency information output from said lower spatial frequency detection means, and spatial frequency information to be inputted to said interpolation direction composition means or said interpolation pixel composition means is formed.

17. A spatial frequency adaptive field-interpolation apparatus in accordance with claim 16, wherein in a pixel group on the upper scanning line or the lower scanning line on said interpolation line in the vicinity of said attentional pixel, in the case that said pixel group is divided into a central group in the vicinity of said attentional pixel, a left group placed leftward of said central group and a right group placed rightward of said central group, said upper spatial frequency detection means and said lower spatial frequency detection means comprises:

first level difference detection means for deriving a first level difference between a first representative value of said central group and a second representative value of said left group, second level difference detection means for deriving a second level difference between said first representative value and a third representative value of said right group, average level difference detection means for deriving an average level difference of said first level difference and said second level difference, third level difference detection means for deriving a third level difference between said second representative value and said third representative value, and spatial frequency determination means for forming horizontal spatial frequency information by comparing said average level difference with said third level difference.

* * * * *